(12) United States Patent
Kubo et al.

(10) Patent No.: US 6,639,626 B1
(45) Date of Patent: Oct. 28, 2003

(54) PHOTOGRAPHING APPARATUS WITH TWO IMAGE SENSORS OF DIFFERENT SIZE

(75) Inventors: Hiroaki Kubo, Mukou (JP); Masahito Niikawa, Sakai (JP); Toshihiro Hamamura, Osaka (JP); Kenji Nakamura, Takatsuki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/335,416

(22) Filed: Jun. 17, 1999

(30) Foreign Application Priority Data

Jun. 18, 1998 (JP) ........................................... 10-170983
Jun. 29, 1998 (JP) ........................................... 10-182037

(51) Int. Cl.$^7$ ..................... H04N 5/225; H04N 5/235; H04N 5/222
(52) U.S. Cl. ............................... 348/218.1; 348/333.11; 348/222.1; 348/335
(58) Field of Search .................... 348/218.1, 219.1, 348/335, 343, 344, 333.11, 236, 337, 222.1, 64; 396/429

(56) References Cited

U.S. PATENT DOCUMENTS 5,172,220 A * 12/1992 Beis ........................... 348/262
5,379,069 A * 1/1995 Tani ........................ 348/333.11
5,694,165 A * 12/1997 Yamazaki et al. ........... 348/335
5,757,423 A    5/1998 Tanaka et al.
5,764,285 A * 6/1998 Ochi et al. ................ 348/222.1
5,978,023 A * 11/1999 Glenn .......................... 348/234

* cited by examiner

Primary Examiner—Wendy R. Garber
Assistant Examiner—Lin Ye
(74) Attorney, Agent, or Firm—Sidley Austin Brown & Wood LLP

(57) ABSTRACT

An photographing apparatus comprises a photographing lens, a first area sensor, a second area sensor, a display, a manipulation unit, and a processor. The first area sensor has a plurality of pixels, and photoelectrically converts an optical image of an object into first pixel data. The second area sensor has a plurality of pixels, the number of pixels of the second area sensor being greater than the number of pixels of the first area sensor, and photoelectrically converts an optical image of an object into second pixel data. The display displays the first pixel data supplied from the first area sensor as a preview image before image recording. The manipulation unit allows a user to start image recording. The processor combines the first pixel data and the second pixel data supplied form the first and second area sensors to produce a composite image when the manipulation unit is operated.

14 Claims, 16 Drawing Sheets

PHOTOGRAPHING APPARATUS WITH TWO IMAGE SENSORS OF DIFFERENT SIZE

The present invention claims a priority based on Japanese Patent Applications Nos. H10-170983 and 10-182037, the contents of which are incorporated hereinto by reference in its entirety.

BACKGROUND OF THE INVENTION

1. Field of the Invention

This invention relates to a photographing apparatus such as a digital camera.

2. Description of the Related Art

Along with the progress of semiconductor techniques and image processing techniques, digital cameras are rapidly spreading in place of silver halide film cameras. In general, with a digital camera, an optical image formed by a photographing lens is photoelectrically converted into electric signals by image pick-up devices, such as CCDs (Charge Coupled Devices). The electric signals are subjected to image processing in order to generate image data, and the image data are stored in a recording medium, such as a memory card.

In recent years, a so-called single-lens reflex digital camera which uses the body of a silver halide single-lens reflex camera with which pictures are taken using silver halide films has been proposed. Such a single-lens reflex digital camera can make use of the resources of the silver halide single-lens reflex camera, and a CCD array is provided at a position of the film gate of the silver halide single-lens reflex camera.

Since the image quality of a digital camera is affected by the number of pixels of the image pick-up devices, it is desirable to use a large-sized CCD array having a number of pixels in order to guarantee the same level of image quality as the silver halide single-lens reflex camera. However it is difficult to manufacture a large-sized CCD array with a number of pixels, and the product yield would become very low.

To overcome this problem, it was proposed to incorporate three compact image pick-up devices in a digital camera, two of which are combined and used to artificially obtain luminance data from twice as many pixels as a conventional array, and the other one is a compact colour image pick-up device for obtaining colour information. However, this structure requires an optical system for splitting the optical path into the three image pick-up devices, and consequently, the size and the weight of the camera increase. In addition, it is difficult to adjust the optical axis with respect to the three image pick-up devices.

As another technique for a digital camera, a preview image is displayed on a display panel (e.g., as LCD panel) at a moving image data for checking the object.

However, if a plurality of image sensors are used, combined with the preview display technique, in order to increase the number of pixels, it requires time to read out the pixel signals from the image sensors, and the image updating rate becomes slow. If the image captured by the image sensors is used as a preview image as it is, the preview image cannot be displayed at the moving-image rate.

SUMMARY OF THE INVENTION

Therefore, it is an object of the present invention to overcome these problems in the prior art, and to provide a photographing apparatus which can produce pictures of high image quality without using a large-sized imaging device.

An another object of the present invention is to provide a photographing apparatus, which is small in size and light in weight and can facilitate adjustment of the optical axis, as compared with a photographing apparatus using a combination of three imaging devices.

Yet another object of the present invention is to provide a photographing apparatus which can display a preview image at a rate of a moving image, while a high-quality photographing image is achieved by using a combination of image sensors with an increased number of pixels.

In one aspect of the present invention, the object is achieved by a photographing apparatus which comprises a photographing lens, a first area sensor, a second area sensor, a display, a manipulation unit, and a processor. The first area sensor has a plurality of pixels, and photoelectrically converts an optical image of an object formed by the photographing lens into the first pixel data. The second area sensor has a plurality of pixels, the number of pixels of the second area sensor being greater than the number of pixels of the first area sensor, and photoelectrically converts an optical image of the object formed by the photographing lens into second pixel data. The first pixel data supplied from the first area sensor is displayed on the display unit as a preview image prior to image recording. The manipulation unit allows a user to begin image recording. The processor combines the first and second pixel data supplied from the first and second image sensors to produce a composite image when the manipulation unit is operated.

With this photographing apparatus, only two area sensors (i.e., the first and second area sensors) are used to produce a composite image. As a result, the size and the weight of the photographing apparatus can be kept small, as compared with a conventional photographing apparatus using a combination of three image sensors. In addition, it is easier to adjust the optical axis with respect to the two sensors, as compared with a triple-sensor type photographing apparatus.

Because the first pixel data supplied from the first area sensor, which has fewer pixels and is mainly used to generate a preview image, is combined with the second pixel data output from the second area sensor, which has more pixels than the first area sensor, in response to manipulation of the manipulation unit for starting image recording, a high-quality photographic image can be obtained without increasing the sizes of the respective area sensors.

Preferably, the first area sensor outputs colour information of the object, and the second area sensor outputs luminance information of the object.

BRIEF DESCRIPTION OF THE DRAWINGS

The above and other objects, features, and advantages of the present invention will be apparent from the following detailed description of the preferred embodiments with reference to the attached drawings, wherein.

DETAILED DESCRIPTION OF THE PREFERRED EMBODIMENTS

The digital camera according to the first embodiment will now be described with reference to FIGS. 1 through 7.

Figure 1:
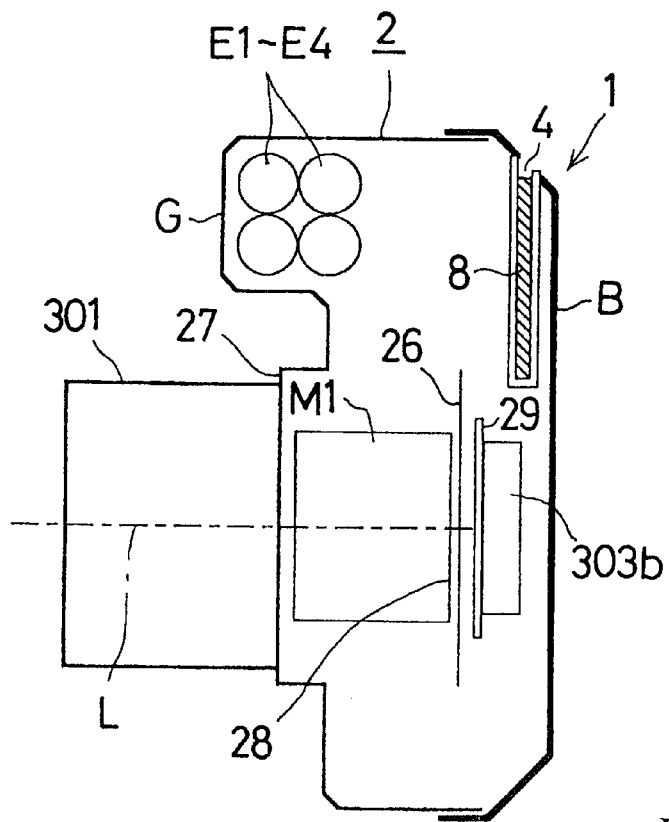
FIG. 1 is a horizontal cross-sectional view of the digital camera according to the first embodiment of the present invention.
Figure 2:
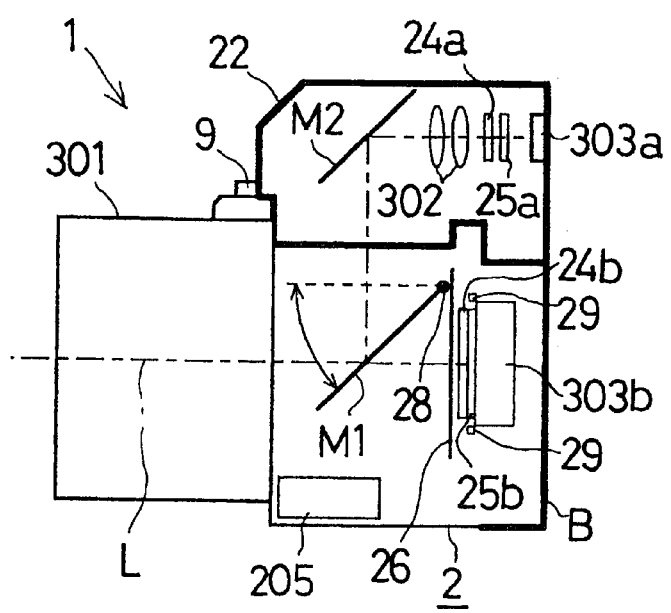
FIG. 2 is a right-side cross-sectional view of the digital camera shown in FIG. 1.
Figure 3:
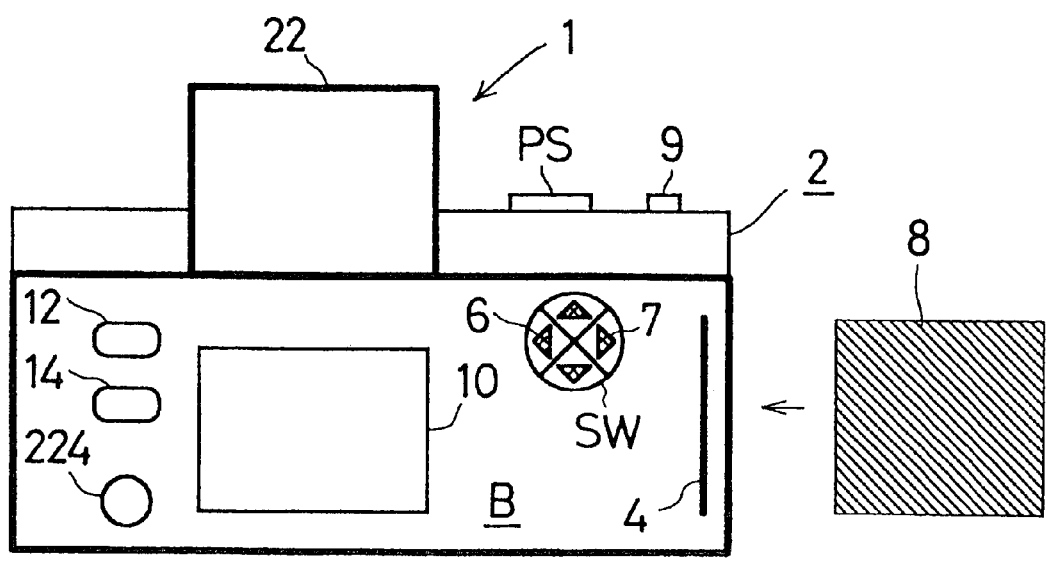
FIG. 3 is a rear view of the digital camera shown in FIG. 1.

The digital camera 1 has a rectangular box type camera body 2, and a photographing lens 301 which is an exchangeable lens for a silver halide single-lens reflex camera, as shown in FIGS. 1 through 3.

The camera body 2 utilizes the body of a silver halide single-lens reflex camera. However, a first image pick-up unit 22 is incorporated in the camera body in place of the focussing screen and the finder of the silver halide single-lens reflex camera. The back cover of the silver halide camera is also replaced by a back cover B which functions as a second image pick-up unit.

The front face of the camera body 2 is provided with a mount 27 for receiving the photographing lens 301. A grip G is formed on either side (left or right side) of the camera body 2.

The photographing lens 301 is driven by an AF (autofocus) actuator 205 which is built in the camera body 2 as a lens driving actuator for the silver halide single-lens reflex camera.

Inside the camera body 2, a quick return mirror M1 is supported by a pivot axis 28 in a pivotable manner. The quick return mirror M1 functions as an optical-path switching means for bending the light path L from the photographing lens 301 upward by 90 degrees so that the light is guided to the first image pick-up unit 22. The motion of the quick return mirror M1 is the same as the quick return mirror of the silver halide single-lens reflex camera. To be more precise, the quick return mirror M1 is tilted obliquely with respect to the lens axis of the photographing lens 301, as indicated by the solid line in FIG. 2, until the shutter release button is pressed. If the shutter release button has been pressed, the quick return mirror M1 is pivoted upward about the pivot axis 28 toward the horizontal position indicated by the dashed line in FIG. 2.

Inside the photographing unit 22, a fixed mirror M2 is provided to bend the light path L from the quick return mirror M1 backward by 90 degrees in order to guarantee a sufficient path length for the relay lens 302. A first colour CCD 303a is positioned behind the fixed mirror M2. The first CCD 303a photoelectrically converts an optical image formed by the photographing lens 301 into electric pixel data. The relay lens 302 is positioned in front of the first CCD 303a in order to correctly focus the optical image onto the first CCD 303a.

Returning to the camera body 2, a focal plane shutter 26 is positioned behind the quick return mirror M1 inside the camera body 2. A second monochromatic CCD 303b is provided to the back cover B on the light path L of the photographing lens 301, so that the second CCD 303b is located behind the focal plane shutter 26 and beside the film gate 29.

Infrared cut filters 24a and 24b, which match with the characteristics of the first and second CCDs 303a and 303b, and optical low-pass filters 25a and 25b, which correspond to the pixel sizes of the first and second CCDs 303a and 303b, are inserted in front of the first CCD 303a (provided in the photographing unit 22) and the second CCD 303b (provided to the inner face of the back cover B). Due to the thicknesses of the filters 24b and 25b, the light-receiving surface of the second CCD 303b is positioned slightly backward the film gate 29 of the silver halide single-lens reflex camera. However, the light path is designed so that light can be correctly focussed on the second CCD 303b from the infinity to the short range determined by the specification of the photographing lens 301 without a relay lens.

The first CCD 303a is relatively small with a small number of pixels, and used to obtain a finder preview image and colour information of the image. The second CCD 303b is a monochromatic CCD which is larger than the first CCD 303a with a greater number of pixels, and is used to obtain the luminance information of the image. It is known that human vision is much more sensitive to a change in luminance than to a change in colour. Accordingly, the first CCD 303a is designed to obtain colour difference signals (Cb, Cr), while the second CCD 303b obtains luminance signals Y, as will be described in more detail later. The colour difference signal and the luminance signal are combined to generate necessary and sufficient image data. To be more precise, the first CCD 303a has 0.4 million pixels arranged in a Bayer (**phonetic) matrix, and the second CCD 303b has 1.6 million pixels via a monochromatic green filter. The numbers of pixels in a row and a column of the first CCD 303a are one half of those of the second CCD 303b.

A slot 4 is formed on one side (e.g., on the right side of the rear view in FIG. 3) of the back cover B, through which a memory card 8,—an example of the recording medium for storing photographed images—is inserted in the camera. An LCD (liquid crystal display) 10 is also provided to the outer face of the back cover B. The LCD 10 is used as a monitor (which corresponds to a view finder) during photographing and reproduction of the stored images.

A connector 224 for electrically connecting the digital camera 1 to an external personal computer 19 (shown in FIG. 4) is provided to the bottom left of the back cover B. A compression rate setting switch 12 and a mode setting switch 14 are provided above the connector 224. The compression rate setting switch 12 is, for example, of a sliding type, and it is used to set the compression rate k of image data to one of the available values when recording the image date in the memory card 8. The mode setting switch allows a user to switch the operation mode between the photographing mode and the reproduction mode. The digital camera 1 according to this embodiment has two compression rates, 1/8 and 1/20. For example, by sliding the compression rate switch 12 to the right, the compression rate k is set to 1/8, and it is changed to 1/20 by sliding the switch to the left. Of course, the compression rate k and the number of available states may be changed to other values.

In the photographing mode, the user takes pictures. In the reproduction mode, the user can reproduce the photographed image stored in the memory card 8 and display the reproduced image on the LCD 10. The mode setting switch 14 is, for example, a bicontact sliding switch, like the compression rate setting. switch 12, and the reproduction mode is selected if the switch 14 is slid to the right, while the photographing mode is selected with the switch 14 slid to the left.

A quartered button switch SW is positioned at the top right of the back cover B. The quartered button switch SW includes two horizontal switches 6 and 7 which allow the user to feed frames of images when the recorded images are reproduced. The switch is used to feed frames in the forward direction (with the increasing frame number), and is called an Up-key. The switch 7 is used to feed frames in the backward (with the decreasing frame number), and is called a Down-key.

A rotary power switch PS is provided on the top face of the camera body 2. A shutter release button 9 is provided on the top of the grip G.

Inside of the grip G is a battery cell chamber, in which, for example, AA-size batteries E1–E4 are stored.

With the digital camera 1 of this embodiment, the quick return mirror M1 (which is depicted as the solid line in FIG. 2) is obliquely tilted downward in the photographing mode, as in the silver halide single-lens reflex camera. Accordingly, the optical image formed by the photographing lens 301 is reflected by the quick return mirror M1 upward, guided to the photographing unit 22, further reflected by the fixed mirror M2 backward, and finally focussed on the first CCD 303a via the relay lens 302. The image captured by the first CCD 303a is displayed on the LCD 10, which functions as a view finder at this time, whereby the user can check the photographing range.

If the shutter release button 9 is pressed, the quick return mirror M1 returns to the horizontal position indicated by the dashed line in FIG. 2, as in the silver halide single-lens reflex camera, and then, the focal plane shutter 26 is opened for a predetermined time. In this way, the optical image formed by the photographing lens 301 is focussed on the second CCD 303b without being blocked by the quick return mirror M1. The image focussed on the second CCD 303b is the same as that was confirmed through the LCD 10 before the shutter release button was pressed.

In order to make the photographing range checked through the LCD 10 in agreement with the actual photographing range, in this embodiment, the ratio of the focal length of the photographing lens 301 to the size of the light receiving area of the second CCD 303b is set so as to be equal to the ratio of the composite focal length of the photographing lens 301 and the relay lens 302 to the size of the light-receiving area of the first CCD 303a. For example, if the focal length of the photographing lens 301 is set to 36 mm, and the composite focal length of the photographing lens 301 and the relay lens 302 is set to 18 mm, then the light-receiving area of the second CCD 303b is set to 18 mm×12 mm, and the light receiving area of the first CCD 303a is set to 9 mm×6 mm. Thus, the ratio of the focal length to the longer side of the CCD is 2:1, and the ratio of the focal length to the shorter side is 3:1.

Figure 4:
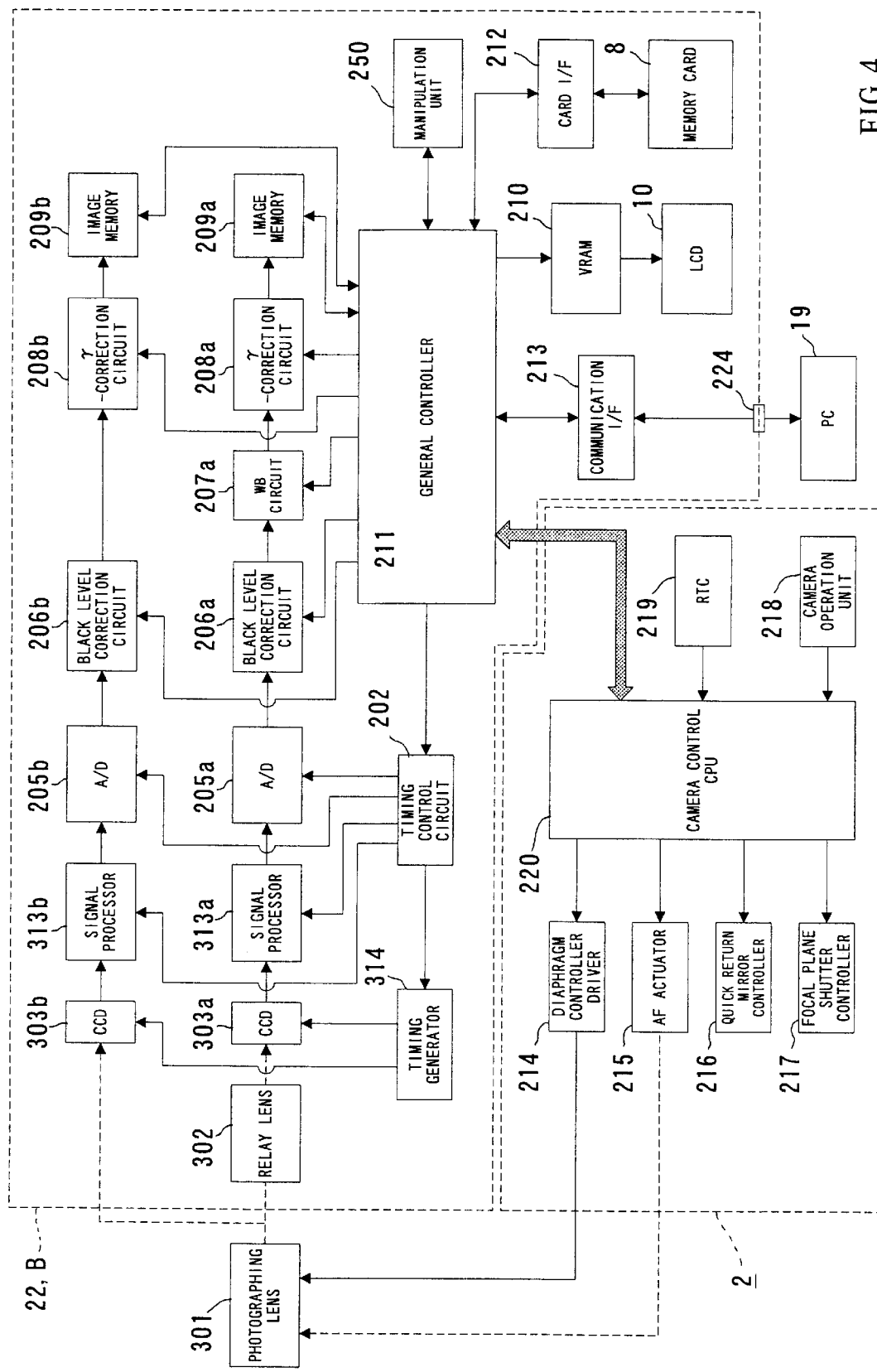
FIG. 4 is a block diagram of the control system of the digital camera shown in FIGS. 1 through 3.

FIG. 4 is a block diagram of the control system of the digital camera 1.

A general controller 211 comprises, for example, a microcomputer, and organically controls each element provided to the back cover B and the components in the first photographing unit 22. The general controller 211 is controlled by the camera control CPU 220.

The camera control CPU 220 also controls the components in the camera body 2, such as a diaphragm control driver 214 for the photographing lens 301, an AF actuator 215, a quick return mirror controller 216, a focal plane shutter controller 217, a camera operation unit 218, and a timer circuit (RTC) 219. The camera operation unit 218 includes the shutter release button 9, the power switch PS, the compression rate setting switch 12, the mode setting switch 14, the Up-key 6, and the Down-key 7, which are provided to the camera body 2. The timer circuit 219 controls the photographed date and time.

The first CCD 303a provided in the photographing unit 22 is a colour area sensor in this embodiment. The first CCD 303a photoelectrically converts the optical image, which was formed by the photographing lens 301 and focussed on the first CCD 303a by the relay lens 302, into pixel signals of colour components of R (red), G (green) and B (blue). In other words, an electric signal consisting of a sequence of pixel signals representing the colours received by the respective pixels is output from the first CCD 303a. On the other hand, the second CCD 303b is a monochromatic area sensor having a monochromatic green filter. The second CCD 303b photoelectrically converts only the green component, and outputs pixel signals of G component. A timing generator 314 generates various timing pulses for controlling the driving time of the CCDs 303a and 303b.

The CCD used in the present invention is not limited to the RGB type of the three primary colours. A YMC type (i.e., a complementary colour type) sensor may be used as the first CCD 303a.

The timing generator 314 generates driving control signals for the first and second CCDs 303a and 303b based on the reference clock supplied from the timing controller 202. The timing generator 314 generates clock signals, such as timing signals for instructing start and termination of integral (i.e., exposure), and readout control signals (e.g., horizontal synchronizing signals, vertical synchronizing signals, and transfer signals) for controlling the timing of reading the light-receiving signals from the pixels, and outputs these signals to the first and second CCD 303a and 303b.

The signal output from the first CCD 303a is processed by the first image processor which comprises a signal processor 313a, an A/D converter 205a, a black level correction circuit 206a, a white balance (WB) circuit 207a, and a gamma correction circuit 208a. The signal output from the second CCD 303b is processed by the second image processor which comprises a signal processor 313b, an A/D converter 205b, a black level correction circuit 206b, and a gamma correction circuit 208b.

The analog image signals output from the first and second CCDs 303a and 303b are subjected to predetermined analog signal processing by the signal processors 313a and 313b. Each signal processor has a CDS (correlated double sampling) circuit for reducing the noise of the pixel signal, and an AGC (automatic gain control) circuit for adjusting the gain, whereby the level of the image signal is regulated.

The A/D converters 205a and 205b convert each of the analog pixel signals contained in the image signal into a 10-bit digital signal, based on the A/D conversion clock supplied from the timing controller 202.

The black level correction circuits 206a and 206b correct the black levels of the digitalized pixel signals (which is referred to as pixel data) to the reference black level.

The WB circuit 207a transforms the levels of the pixel data of the colour components of R, G, and B, using a level transformation table incorporated in the general controller 211, so that the pixel level of each colour component is adjusted after gamma correction taking the white balance into account. The transformation coefficient (i.e., the slope of the characteristic) of each colour component of the level transformation table is determined by the general controller 211 for each photographed picture. The WB circuit 207a is provided only to the first image processor which obtains colour information, and is not provided to the second image processor for obtaining luminance information.

The gamma correction circuits 208a and 208b correct the gamma characteristic of the pixel data. Each of the gamma correction circuits 208a and 208b has, for example, 6 types of gamma correction tables with different gamma characteristics. An appropriate table is selected according to the photographing scene and conditions.

The image memories 209a and 209b store the pixel data output from the gamma correction circuits 208a and 208b, respectively. The first image memory 209a has a memory capacity of 2 frame data, which means that if the first CCD 303a has a n×m pixel matrix, the memory capacity of the first memory 209a corresponds to 2×n×m pixel data. The second image memory 209b has a memory capacity of one frame data, that is to say that if the second CCD 303b has an n×m pixel matrix, the memory capacity of the second memory 209b corresponds to n×m pixel data. In both image memories 209a and 209b, each pixel data is stored in the corresponding address of the image memories.

VRAM 210 is a buffer memory for image data which is to be reproduced and displayed on the LCD 10. VRAM 210 has a memory capacity corresponding to the number of pixels of the LCD 10.

The card I/F 212 in an interface for writing and reading image data into and from the memory card 8. The communication I/F 213 is an interface based on the USB standard, which allows the digital camera 1 to be externally connected to a personal computer 19.

In the waiting state (i.e., in the photographing mode), each pixel data of an object is captured by the first CCD 303a every 1/30 second, and is stored in the image memory 209a after being subjected to the prescribed signal processing by the first image processor. At the same time, the pixel data is transferred to the VRAM 210 via the general controller 211, and displayed on the LCD 10 so that the user can confirm the photographing image of the object through the LCD 10. In the reproduction mode, the image read out from the memory card 8 is transferred to the VRAM 210 after being subjected to prescribed signal processing by the general controller 211, and displayed on the LCD 10.

In the waiting state, the general controller 211 determines the contrast of the center portion of the image data stored in the image memory 209a, and then, transmits a focussing signal to the camera control CPU 220 based on the detected contrast. The camera control CPU 220 drives the AF actuator 205 so that the contrast becomes maximum, and maintains the focussing state.

During photographing, if the shutter release button 9 is pressed, and focal plane shutter 26 is opened, then the pixel data captured by the second CCD 303b is supplied to the second image processor, subjected to image processing by the signal processor 313b, the A/D converter 205b, the black level correction circuit 206b, and the gamma correction circuit 208b, and finally stored in the corresponding pixel address of the image memory 209b.

As a feature of this embodiment, the first image signal, which is generated by the first CCD 303a and used as a finder preview image, is combined with the second image data, which is generated by the second CCD 303b in response to a shutter release, by the general controller 211, whereby a shot of photographing image data is produced.

This image composition process will be explained in more detail with reference to FIGS. 5 through 7.

<Photographing Mode (Waiting State)>

Figure 7:
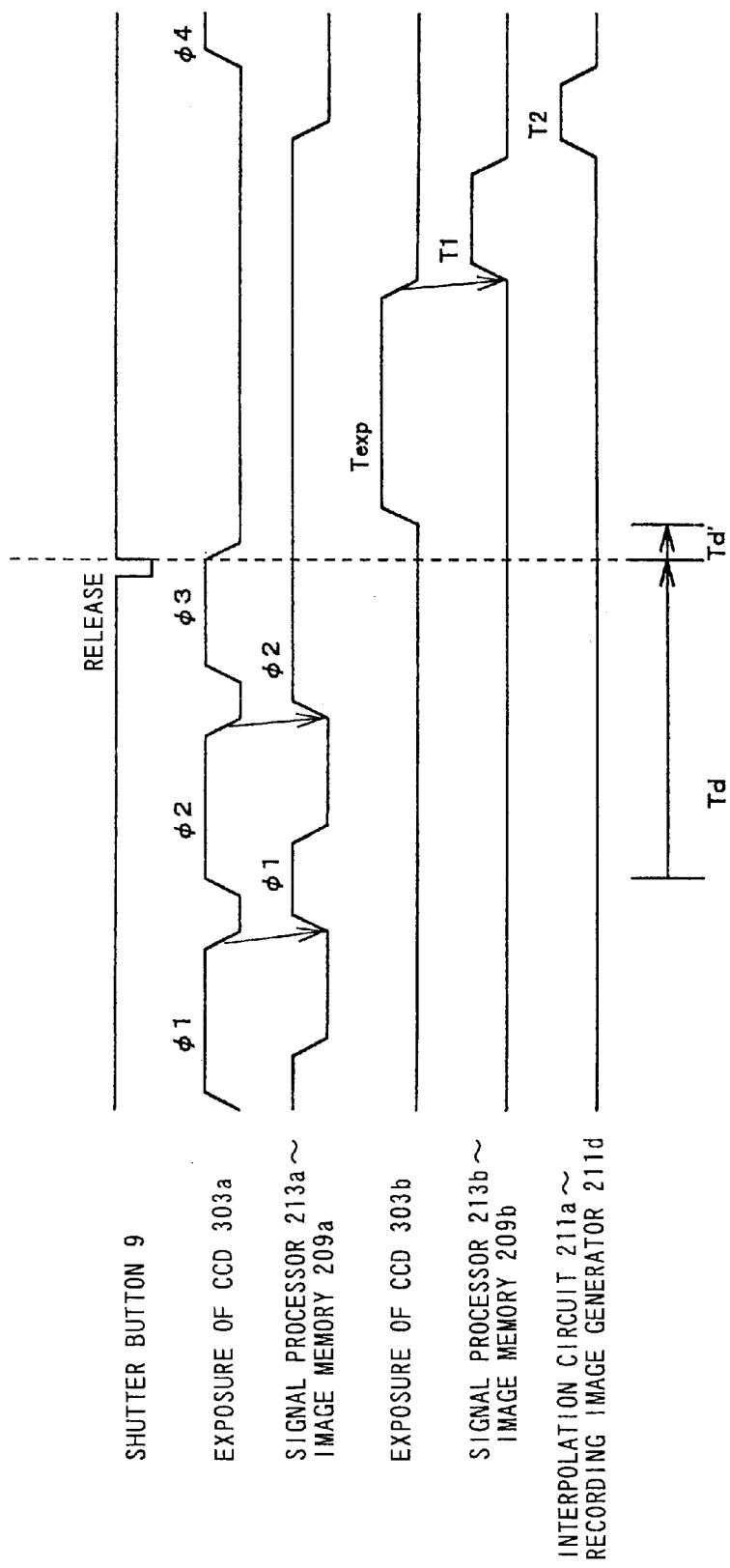
FIG. 7 is a timing chart of the image composition process shown in FIG. 6.

In the waiting state, two frames of image data ($\phi 1$, $\phi 2$, . . . ), which were captured by the first CCD 303a every 1/30 second and subjected to image processing by the image processor (including the signal processor 313a through the gamma correction circuit 208a), are stored in the image memory 209a, as shown in FIG. 7. The image data stored in the image memory 209a is supplied to the general controller 211. A frame of image data is then thinned out by the pixel number converter 211f (FIG. 5) at a predetermined rate, transferred to the VRAM 210, and displayed as a live view image on the LCD 10.

<Photographing Mode (Photographing State)>

If the shutter release button 9 is pressed during the exposure ($\phi 3$) of the first CCD 303a, the exposure is stopped, and the other frame of image data of the previous exposure ($\phi 2$) stored in the image memory 209a is processed. The quick return mirror M1 is pivoted, and the focal plane shutter 26 is opened to start exposure (Texp) of the second CCD 303b.

When the exposure of the second CCD 303b is finished, the pixel data captured by the second CCD 303b is subjected to image processing by the signal processor 313b, the A/D converter 205b, the black level correction circuit 206b, and the gamma correction circuit 208b, and stored in the image memory 209b (T1).

After that, image composition is started at time T2 shown in FIG. 7.

Figure 5:
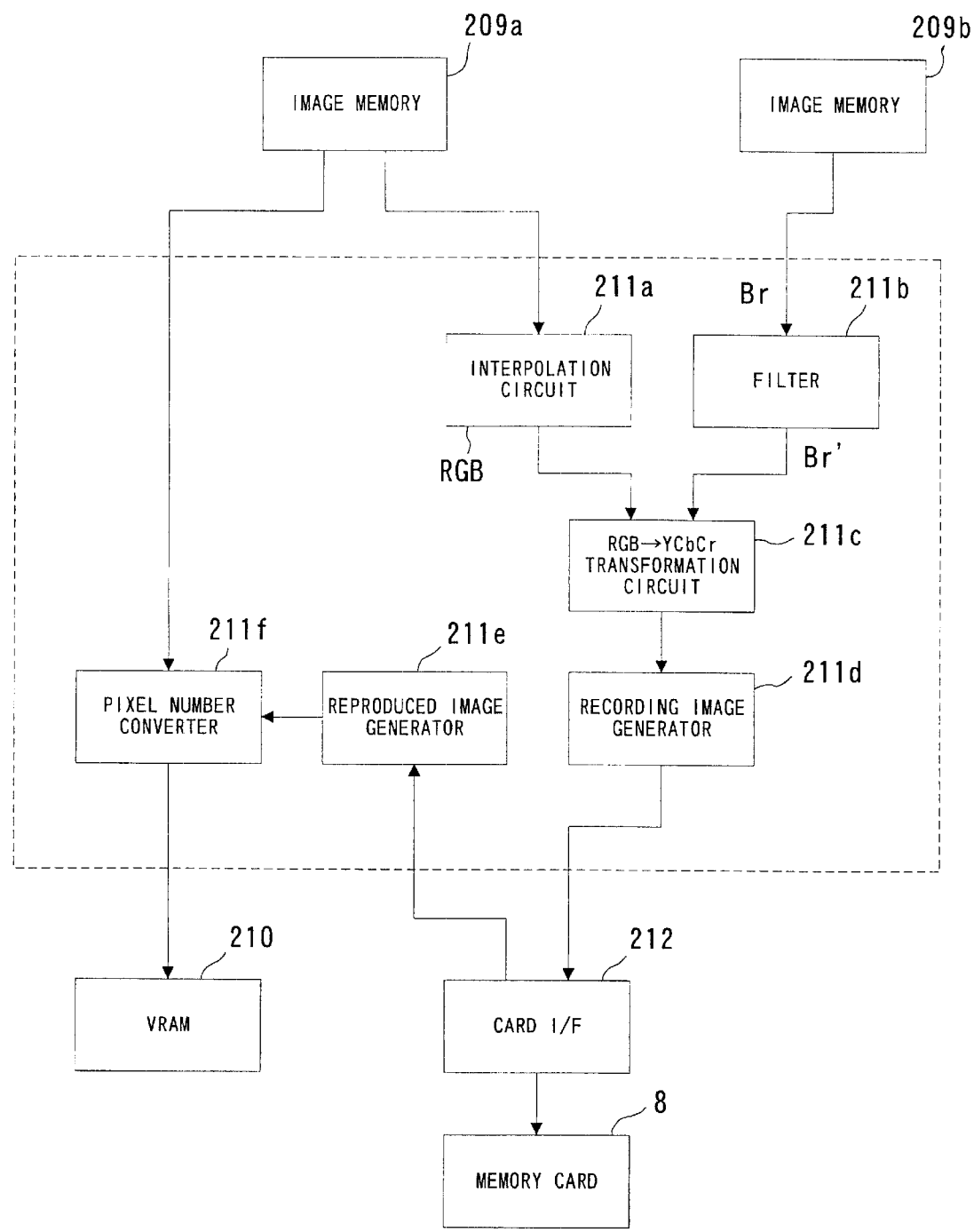
FIG. 5 is a block diagram of the general controller in the control system shown in FIG. 4.

First, as shown in FIG. 5, the first image data is read out from the first image memory 209a, and subjected to interpolation by the interpolation circuit 211a. The first CCD 303a has a Bayer matrix with a pixel size of 1/4 of the second CCD 303b (each side being 1/2 of the corresponding side of the second CCD 303b), as shown in FIG. 6(①). The pixel data of the first CCD 303a is separated into three components, G, R, and B (indicated by ②, ③, and ④ in FIG. 6). The number of pixels of each colour component is quadrupled by linear interpolation so that the pixel matrices become equal in size to the second CCD 303b (⑤, ⑥, and ⑦ in FIG. 6). The currently processed data is temporarily stored in the work memory (not shown) in the general controller 211.

On the other hand, the second image data is read out from the second CCD 303b, and supplied to the filter 211b in the general controller 211. In the filter 211b:

1) the luminance level Br(x, y) of the image stored in the second CCD 303b is multiplied by the exposure value (the diaphragm value or the shutter speed) of the second CCD 303b and a prescribed coefficient in accordance with the sensitivity of the CCD 303b, in order to make the luminance level of the second image substantially equal to the first image captured by the first CCD 303a; and 2) the contour of the image is corrected by compensating for the high frequency component of the image to be recorded using a digital filter.

The filter consists of five digital filters, namely, a digital filter for performing standard contour correction, two digital filters for enhancing the contour, and two digital filters for weakening the contour with respect to the standard correction. The output of the filter is denoted as Br'.

Figure 6:
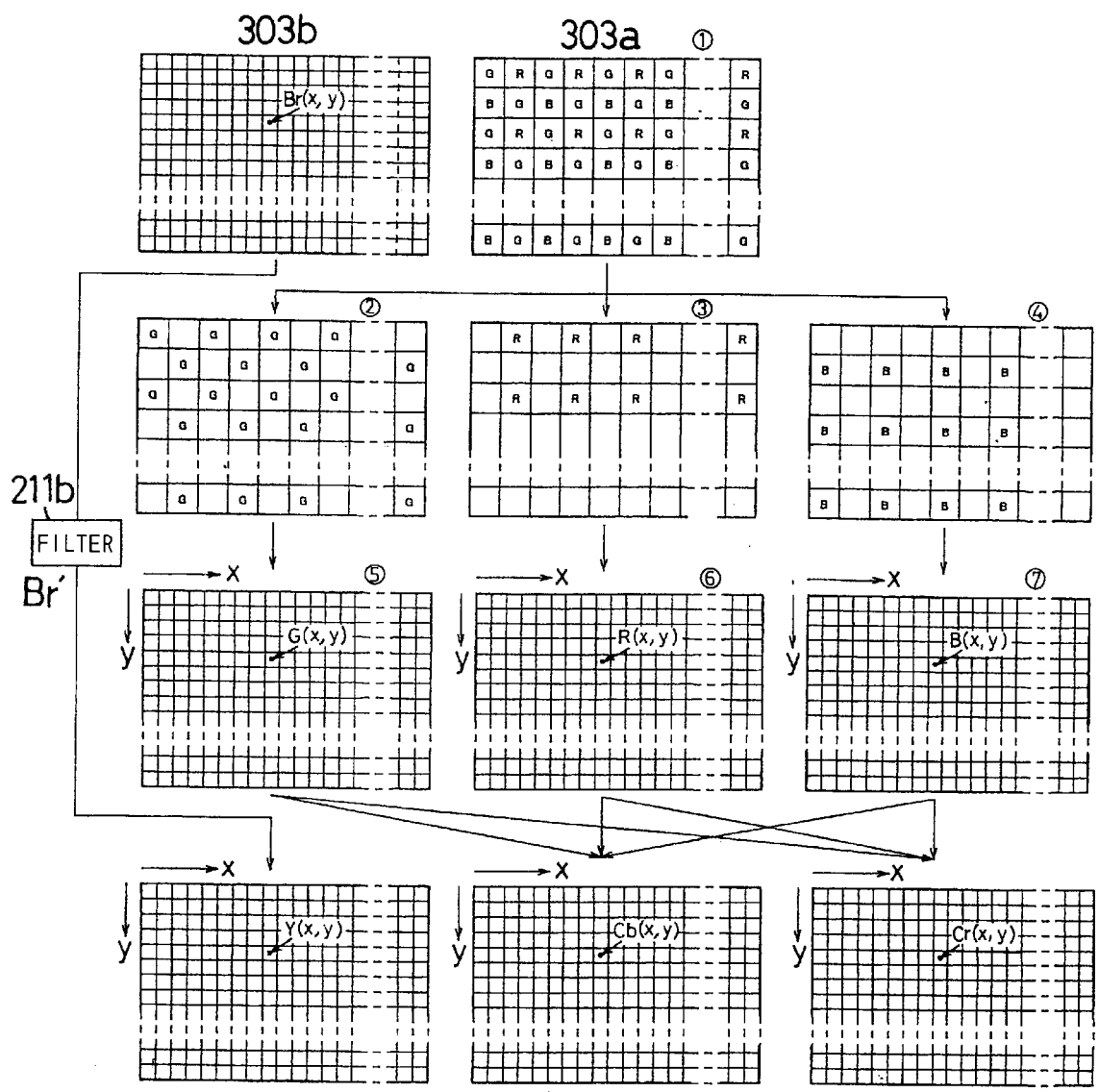
FIG. 6 schematically illustrates transition of image composition process for capturing the photographed image.

Then, the colour space is transformed from the RGB space to a YCbCr space by the transformation circuit 211c (as shown in the bottom line in FIG. 6). The transformation is defined by the following equation.

$$\begin{pmatrix} Y \\ Cb \\ Cr \end{pmatrix} = \begin{pmatrix} 0 & 0 & 0 \\ 0.1687 & -0.3313 & 0.5 \\ 0.5 & -0.418 & 0.0813 \end{pmatrix} \begin{pmatrix} R \\ G \\ B \end{pmatrix} + \begin{pmatrix} Br' \\ 0 \\ 0 \end{pmatrix}$$

Cb and Cr are determined from the RGB signal obtained from the first CCD 303a. The luminance signal Y is determined from Br', which is originally obtained from the second CCD 303b and subjected to filtering. By this operation, colour information from the smaller size of first CCD 303a, and luminance information from the larger size of second CCD 303b are combined. This operation is also a pre-process of the JPEG compression.

Next, the recording image generator 211d creates a thumbnail image and a compressed image which are to be recorded in the memory card 8. Upon the transformation by the RGB/YCbCr transformation circuit 211c, the image data is successively supplied to the recording image generator 211d, and the thumbnail image is successively recorded in the memory card 8. The thumbnail image is created by reading the image data of the original image at a predetermined interval. The recording image generator 211d also creates a compressed image data by compressing the image data at a compression rate selected by the compression rate setting switch 12. The compression process employs a JPEG technique, such as 2-dimensional DCT transforms and Hofmann encoding. The compressed image data is recorded in the image area of the memory card 8. The thumbnail image and the compressed image are recorded together with tag information (such as the frame number, exposure value, shutter speed, compression rate k, photographing date and time).

If the memory card 8 has a memory capacity of 64 MB, then 270 frames of images can be stored at a compression rate of 1/20. Each frame includes a tag portion, a high-resolution image data (1024×1536 pixels) compressed by a JPEG technique, and a thumbnail image data (96×64 pixels). Each frame of data may be treated as an EXIF type image file, for example.

<Reproduction Mode>

In the reproduction mode, the image data of a frame selected by the Up-key 6 or the Down-key 7 is read out of the memory card 8. The reproduced image generator 211e (FIG. 5) performs expansion of image data and RGB transformation of the colour space. Then, the pixel number converter 211f thins out every predetermined number of pixels so as to conform with the pixel number of the LCD 10. The thinned-out data is transferred to the VRAM 210, and displayed on the LCD 10.

As it has been explained, the image data obtained by the previous exposure (φ2) of the first CCD 303a is combined with the image data from the second CCD 303b. The exposure start timing of the second CCD 303b is delayed from the first CCD 303a by time Td+Td', as shown in FIG. 7. The period Td is maximum 1/15 seconds, and Td' is about 1/30 second which is a mechanical delay by the quick return mirror M1. Since a total delay of about 1/10 second occurs between the exposure of the first and second CCD 303a and 303b, this delay may cause problems if a quickly moving object is photographed.

In order to avoid such problems, the digital camera 1 according to this embodiment comes equipped with the following three modes:

(1) a high-speed shutter prohibiting mode for prohibiting a release of a shutter which shortens the predetermined exposure time;
(2) a shading mode for shading (or filtering) only the Cr and Cb components of the image data during a high-speed shutter release, in order to reduce the spatial frequency of the Cr and Cb data, thereby eliminating offset of Y data from Cr/Cb data due to the quick motion of the object; and
(3) a normal mode which does not perform the above-listed processes (1) and (2).

A desired mode can be selected from the menu page displayed on the LCD 10, using the quartered pressing button SW.

If the high-speed shutter prohibition mode (1) is selected, a shutter release faster than, for example, 1/60 second is prohibited. This prohibition is controlled by the camera control CPU 220.

If the shading mode (2) is selected, a filtering operation defined by the matrix below is performed before the interpolated image data (i.e., the output of the interpolation circuit 211a) is input to the RGB/YCbCr transformation circuit 211c.

$$1/64 \begin{pmatrix} 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \end{pmatrix}$$

The filter coefficient may be changed according to the shutter speed.

In this embodiment, the quick return mirror M1 of the silver halide single-lens reflex camera is used as a light-path switching means for guiding the optical image formed by the photographing lens 301 to the first and second CCD 303a and 303b, depending on the operation mode of the camera. However, a half mirror, which reflects a portion of the light from the object via the photographing lens 301 toward the fixed mirror M2, and which transmits a portion of the light toward the second CCD 303b, may be used. In this case, the mechanical delay Td' of the quick return mirror M1 can be eliminated.

Although the body and the photographing lens of the silver halide single-lens reflex lens are used as the camera body 2 and the photographing lens 301 of the digital camera 1, the digital camera may comprise an exclusive body and lens.

Since two different sizes of imaging devices (CCDs) are used to form a single image, the weight and the size of the camera can be kept compact, unlike the conventional digital cameras using three imaging devices. In addition, the optical axis can be easily adjusted with respect to each of the imaging devices. The smaller imaging device (i.e, the first imaging device) with less pixels outputs colour information of the optical image formed by the photographing lens, while the larger imaging device (i.e., the second imaging device) with more pixels outputs luminance information of the optical image, taking into account the characteristic of human vision. By combining these two information, an image is composed. Thus, a high-quality image can be produced without increasing the total size of the imaging device.

The light path from the object can be switched between the first and second imaging devices by the light-path switching means, whereby the light from the object can be correctly focussed on the first or second imaging device. The light-path switching means is, for example, a movable mirror used in the silver halide single-lens reflex camera. In this case, the switching operation is stable and reliable.

If a relay lens system is provided before the first imaging device, the first imaging device can be made smaller.

With this relay lens system, by setting the ratio of the composite focal length of the photographing lens and the relay lens system to the size of the first imaging device equal to the ratio of the focal length of the photographing lens to the corresponding size of the second imaging device, the photographing range determined from the first imaging device will be consistent with the actual photographing range.

By providing a white balance adjustor to the first image processor which processes the image signal from the first imaging device, more reliable colour information can be obtained from the first image processor, and consequently, a high-quality picture can be produced.

Even if the shutter is released during the exposure of the first imaging device, a composite image is reliably produced using the image data from the previous exposure of the first imaging device.

If contour correction is preformed to the luminance information obtained from the second imaging device, a composite image with contours of an improved quality can be produced.

If the quick return mirror of the silver halide single-lens reflex lens is used as a light-path switching means between the first and second imaging device, a high-speed shutter release exceeding a predetermined shutter speed may be prohibited for purposes of avoiding inappropriate image composition for a quickly moving object, due to a time delay of the second imaging device caused by the mechanical motion of the quick return mirror.

If a quickly moving object is photographed at a high shutter speed, a spatial low-path filter may be applied to the colour information obtained by the first imaging device. In this case, a mismatch of the luminance signal and the colour signal due to the quick motion of the object may be attenuated, and the quality of the composite image can be kept high.

Figure 8:
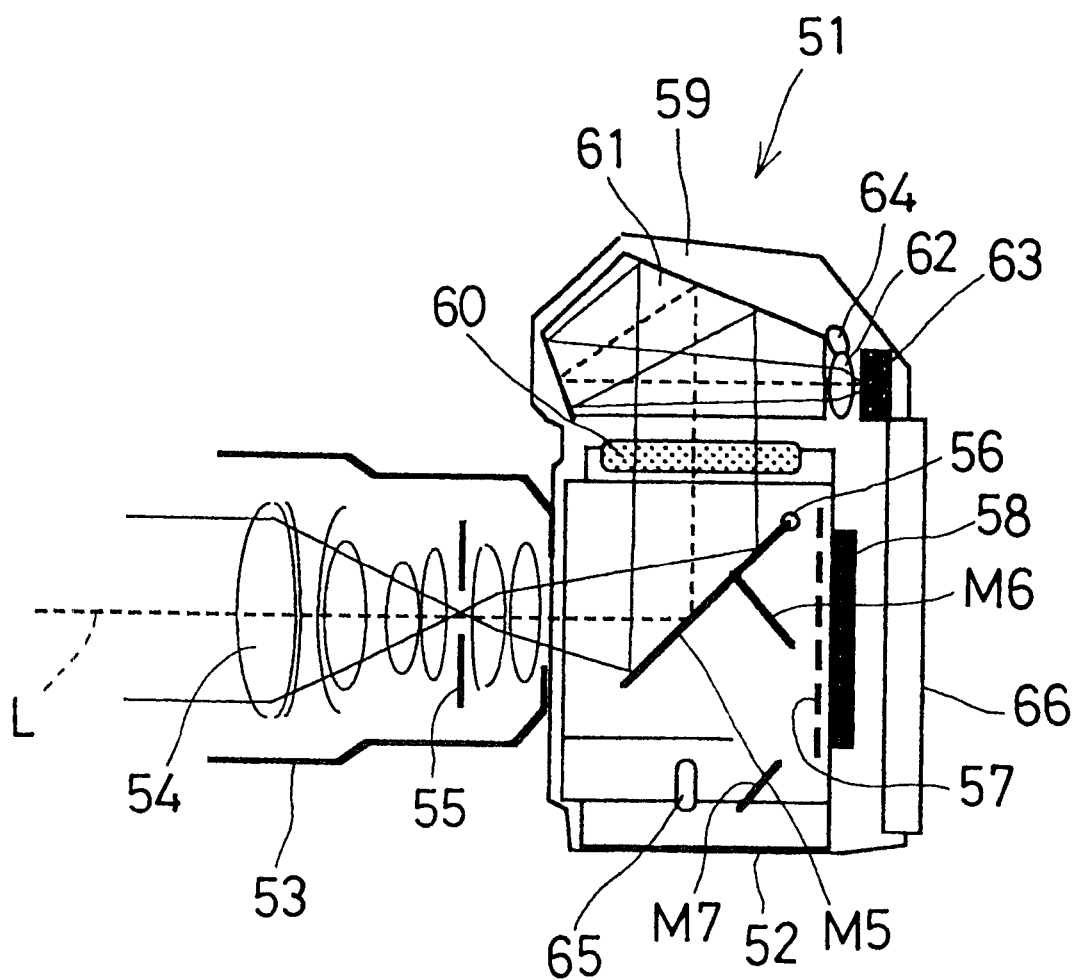
FIG. 8 illustrates the major part of the digital camera according to the second embodiment of the present invention.

Next, the digital camera according to the second embodiment of the present invention will be described with reference to FIGS. 8 through 17. FIG. 8 illustrates the major part of the digital camera, and FIG. 9 illustrates the positional relation of the major part of the camera during a photographing operation.

The digital camera 51 has a camera body 52 which is originally the camera body of a silver halide single-lens reflex camera. A photographing lens unit 53 is attached to the front face of the camera body 52. The photographing lens unit 53 includes a photographing lens 54 and a diaphragm 55.

A quick return mirror M5, which is supported about a pivot axis, is installed inside the camera body 54 so that it is positioned behind the photographing lens 54. A focal plane shutter 57 is positioned behind the quick return mirror M5, and a first image sensor 58 is positioned behind the focal plane shutter 57.

A finder-like unit 59, which corresponds to the finder of the silver halide single-lens reflex camera, is formed in the camera body 52. A pentagonal prism 61 is positioned above a focussing screen 60 in the finder-like unit 59. A relay lens 62 is positioned behind the prism 61. A second image sensor 63 is provided behind the relay lens 62 at a position corresponding to the eyepiece of the silver halide camera. A photometric sensor 64 is provided above the relay lens 62. (The relay lens 62 is not shown in FIG. 9.)

Figure 9A:
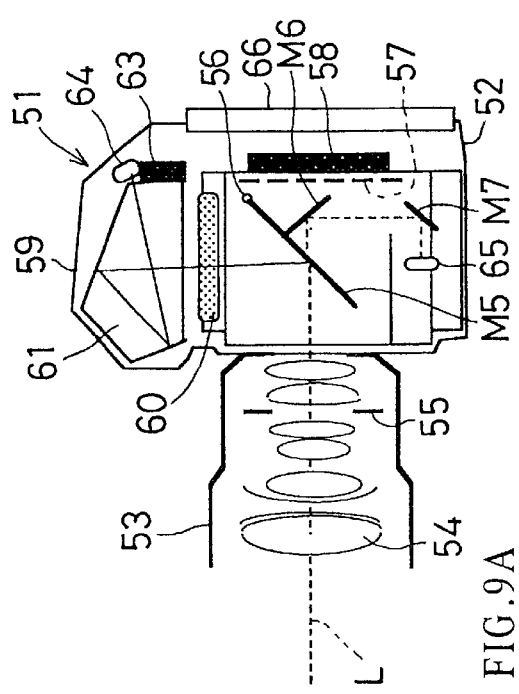
FIGS. 9A through 9B illustrate the operational states of the major part of the digital camera during a photographing action.

The quick return mirror M5 stays at a home position shown in FIGS. 8 and 9A until the shutter release button (not shown) is pressed, in order to guides light path L from the photographing lens 54 to the focussing screen 60. Another mirror M6 is attached to the quick return mirror M5. The optical image which has been transmitted through the half mirror provided to a part of the quick return mirror M5 is guided to a lower distance detecting sensor 65 by the mirror M6 and a fixed mirror M7 positioned below the mirror M6. The distance detecting sensor 65 detects the distance from the object based on the received optical image. The photographing lens 54 is automatically driven to the focussing position based on the detected distance.

The prism 61 inverts and reduces in size the optical image focussed on the focussing screen 60. The inverted image is guided to the photometric sensor 64 and the second image sensor 63. Based on the light quantity detected by the photometric sensor 64, an appropriate diaphragm value and a shutter speed are determined, and in addition, the exposure times of the first and second image sensors 58 and 63 are determined.

Figure 9B:
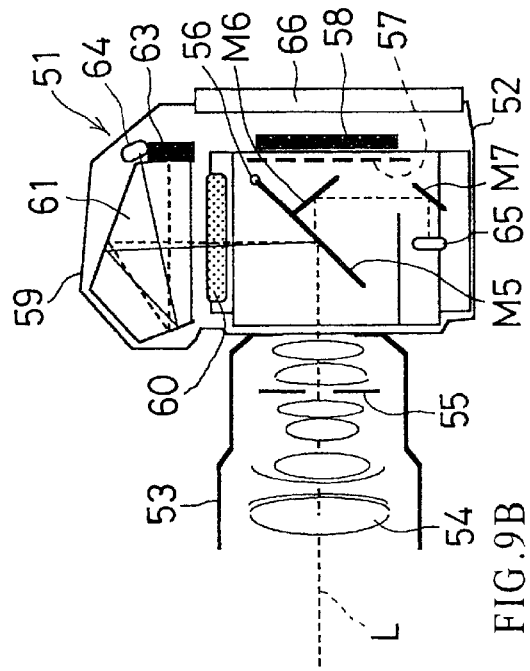
Figure 9C:
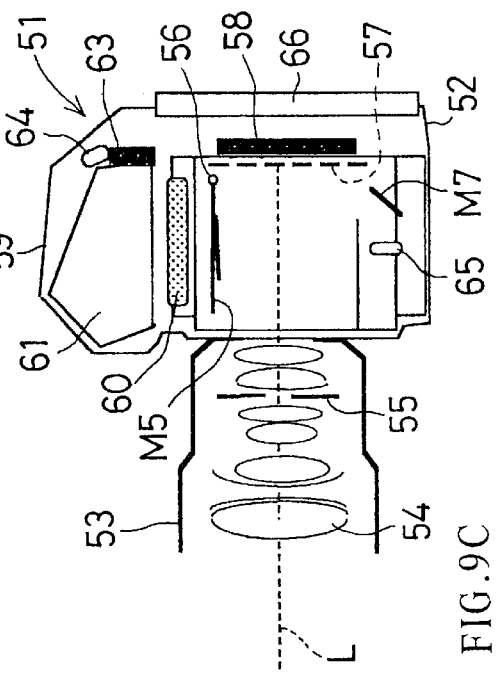
Figure 9D:
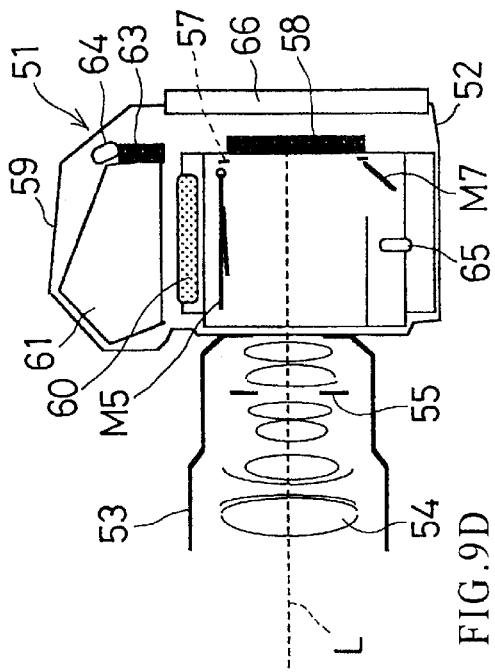

If the shutter release button is fully pressed, the quick return mirror M5 rotates about the pivot axis 56 toward the horizontal position as shown in FIGS. 9C and 9D, in order to release the light path L from the photographing lens 54. Then, the focal plane shutter 57 is opened and closed at a selected shutter speed, whereby the optical image formed by the photographing lens 54 is focussed on the first image sensor 58.

A display panel (e.g., a liquid crystal display) 66 is provided on the rear face of the camera body 52. The image obtained from the second image sensor 63 is used as a preview image, and is displayed on the display panel 66 so as to allow the user to check the picture of the object before the shutter release button is fully pressed.

Figure 10:
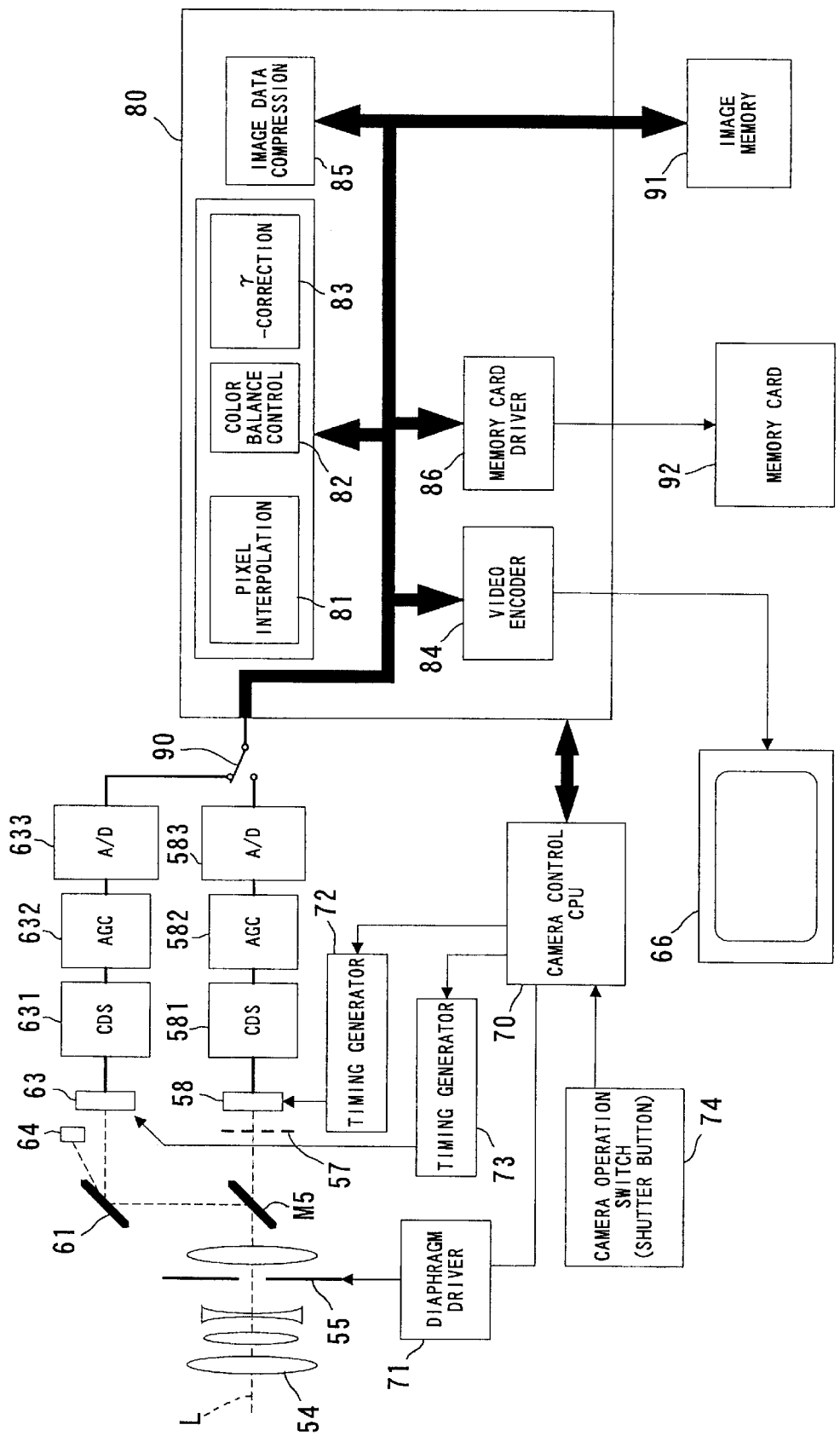
FIG. 10 is a block diagram of the electric system of the digital camera shown in FIGS. 8 and 9.

FIG. 10 is a block diagram showing the electrical structure of the digital camera according to the second embodiment.

The photographing lens 54, the diaphragm 55, the quick return mirror M5, the focal plane shutter 57, the first image sensor 58, the prism 61, the second image sensor 63, and the display 66 are the same as those shown in FIGS. 8 and 9, and the explanation for them will be omitted.

A camera control CPU 70 controls each component in of the camera body 52. The diaphragm 55 is controlled via the control driver 71, and the first and second image sensors 58 and 63 are controlled via the timing generators 72 and 73, respectively. Although not shown in FIG. 10, the quick return mirror M6 and the focal plane shutter 57 are also controlled by the camera control CPU 70.

The camera control CPU 70 is connected to the camera operation switch 74 which includes a shutter button and a power switch.

The first and second image sensors 58 and 63 comprise charge coupled devices (CCD) with different sizes and different number of pixels. The first image sensor 58 is larger in size than the second image sensor 63, and has more pixels than the second image sensor 63. Accordingly, the first image sensor 58 can directly receive the optical image formed by the photographing lens with a large angle of view. However, the read-out speed of frame images is slightly slow. On the other hand, the second image sensor 63, which is smaller than the first image sensor 58 with less pixels, receives an image reduced by prism 61 with a small angle of view, but can read out the frame images quickly.

Figure 11:
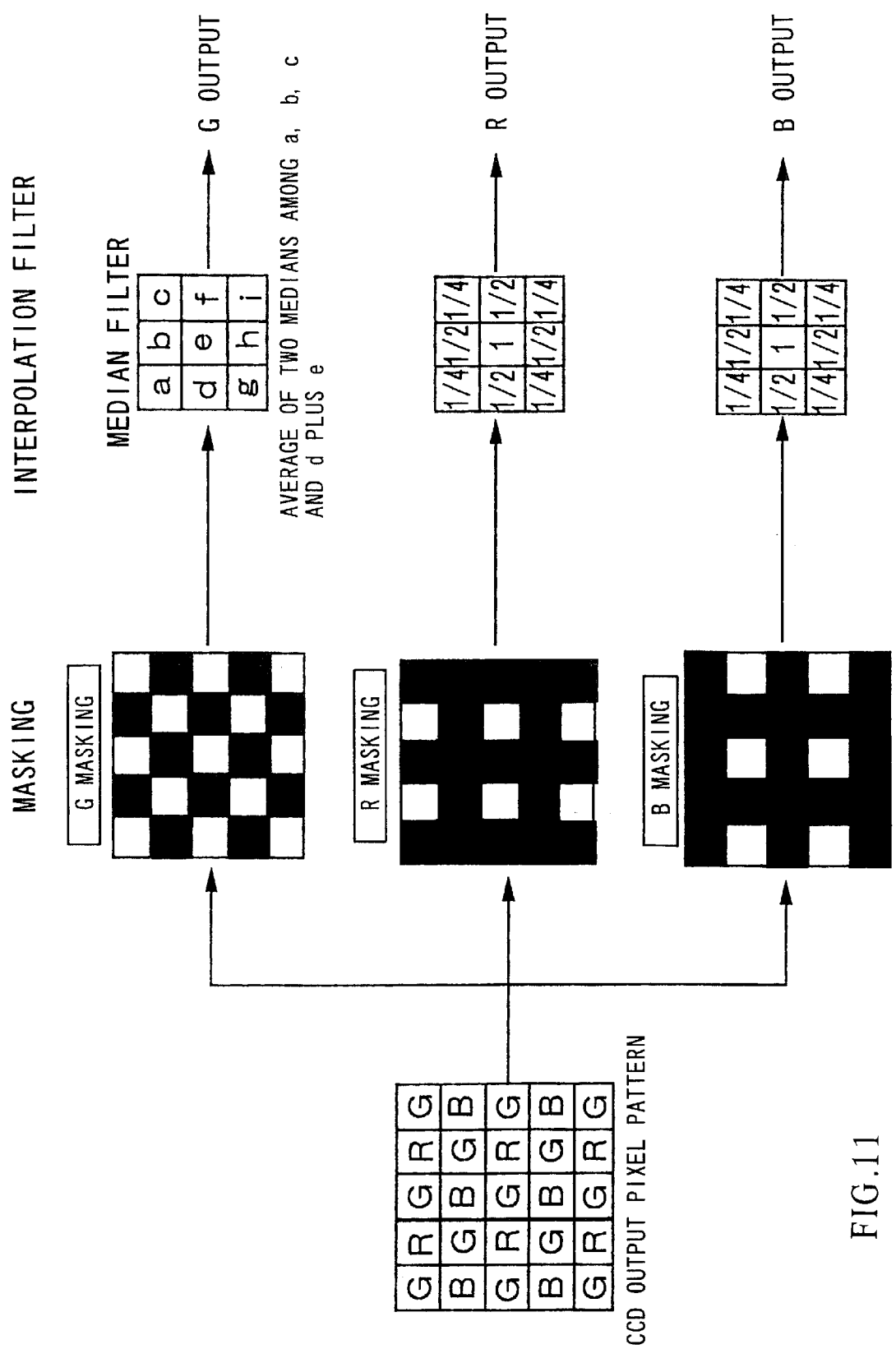
FIG. 11 illustrates a pixel interpolation process for image data.

The first and second image sensors 58 and 63 are area sensors having red (R), green (G), and blue (B) filters, each filter having a prescribed mask pattern, as shown in FIG. 11. The optical image formed by the photographing lens 54 is received by the pixels of the area sensor, and photoelectrically converted into a sequence of pixel signals of R, G, and B components of the corresponding pixels.

The timing generators 72 and 73 generate driving control signals for the first and second image sensors 58 and 63, based on the reference clock supplied from the camera control CPU 70. The timing generators 72 and 73 generates clock signals, such as integration (or exposure) start/termination timing signals and read-out control signals (e.g., horizontal synchronizing signals, vertical synchronizing signals, and transfer signals), and outputs these signals to the image sensors 58 and 63 via drivers (not shown).

The outputs from the first and second image sensors 58 and 63 are processed by CDS (correlated double sampling) circuits 581 and 631, AGC (automatic gain control) circuits 582 and 632, and A/D converters 583 and 633. The CDS circuits reduce noises in the analog image signals supplied from the first and second sensors 58 and 63, the AGC circuits adjust the level of the analog image signals through gain adjustment, and the A/D converters convert the analog signals normalized by the AGC circuits into 10-bit digital signals.

An image processor 80 further processes the outputs of the A/D converters, and create image files. The operation of the image processor 80 is controlled by the image processing CPU.

A switch 90 changes over the connection to the image processors between the two A/D converters. During a preview operation, the A/D converter 633 is connected to the image processor 80 in order to process the image data from the second image sensor 63. During the photographing operation, the connection is changed over to the A/D converter 583.

The signals supplied from the A/D converters 583 and 633 to the image processor 80 are written in the image memory 91 in synchronization with the read-out timing of the image sensors 58 and 63. The subsequent image processing is to be performed by accessing the image memory 91.

The image processor 80 has a pixel interpolation unit 81 interpolates pixels with a prescribed interpolation pattern. In this embodiment, each of the colour components R, G, and B are filtered by the corresponding colour filter having a prescribed mask pattern, as shown in FIG. 11. Since the green component G has a high-frequency band, it is further subjected to a median filter which takes an average of the middle two values of the four peripheral pixels. The R and B components are subjected to mean-interpolation.

The G, R and B signals output from the pixel interpolation block 81 are supplied to the colour balance control unit 82. The colour balance control unit 82 applies gain correction to the interpolated R, G, and B signals independently to adjust the colour balance. The camera control CPU 70 calculates values of R/G and B/G using the mean values of R, G, and B signals. The values R/G and B/G are used as correction gains for the R and B components.

Figure 12:
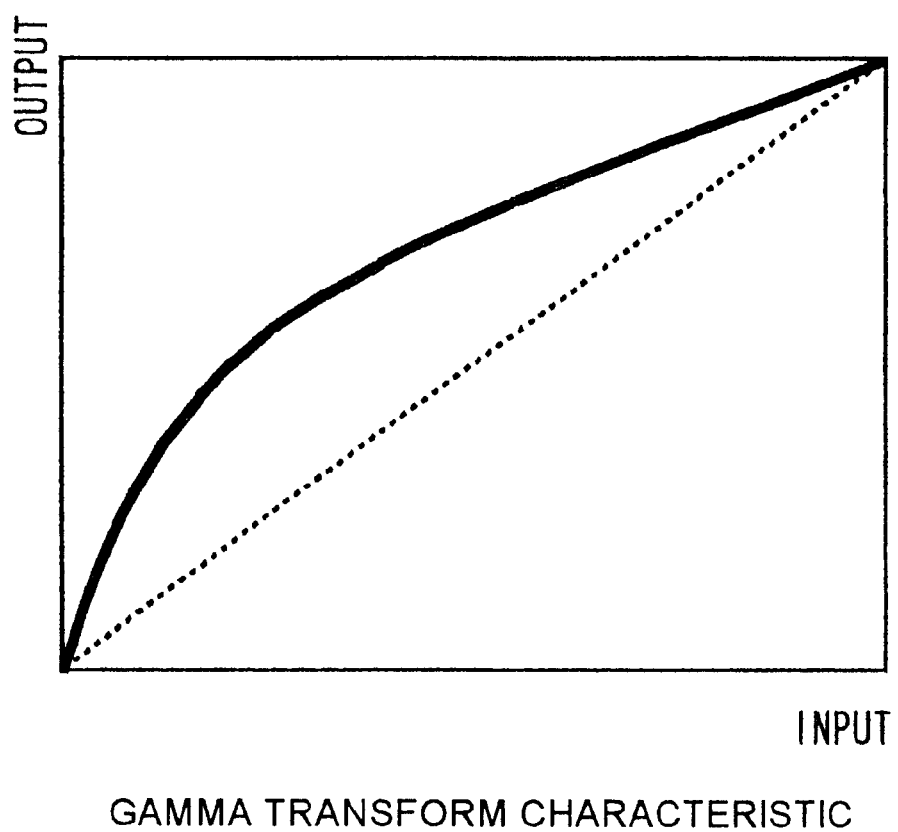
FIG. 12 is a graph showing the gamma-transform characteristic in the gamma correction.

The gamma correction block 83 applies non-linear transformation to the R, G, B outputs having normalized colour balance so that the tone is transformed to an appropriate one suitable to the display panel. The gamma transform characteristic is shown in FIG. 12. The image data which was subjected to gamma correction is stored in the image memory 91.

The video encoder 84 calls the image data stored in the image memory 91, and encodes the data into an NTSC/PAL format. The encoded image data is displayed on the display panel 66. In the preview mode, the image is updated at a predetermined frame period, and therefore, displayed as a moving image on the display panel 66. When the shutter is released, the photographed image is displayed on the display panel 66, and the mode returns to the preview mode after a prescribed time.

The image compression unit 85 calls the image data obtained by the first image sensor 58 from the image memory 91, and compresses the data. The compressed image data is recorded in the memory card 92 via the memory card driver 86.

The memory card 92 is inserted in a predetermined part of the camera body 52 of the digital camera 51.

Next, the operations of the digital camera 51 shown in FIGS. 8 through 10 will be explained.

If the shutter release button is half-depressed, the incident light via the photographing lens 54 and the diaphragm 55 is reflected upward by the quick return mirror M5, and focussed on the focussing screen 60. Then, the optical image is inverted and reduced by the pentagonal prism 61, and focussed on the photometric sensor 64. The photometric sensor 64 detects the quantity of light. Based on the detected light quantity, the camera control CPU 70 computes and generates exposure control data. Then, the diaphragm 55 is controlled via the diaphragm control driver 71 according to the exposure control data, so that the exposure of the image sensors 58 and 63 becomes optimum. At the same time, the timing generators 72 and 73 are controlled so that driving control signals are generated and supplied to the image sensors 58 and 63 at the optimal timing.

Meanwhile, a portion of the incident light on the quick return mirror M5, via the photographing lens 54 and the diaphragm 55, is transmitted through the quick return mirror M5. The transmitted light is guided to the distance detecting sensor 65 via the mirror M6, which is attached to the back face of the quick return mirror M5, and the fixed mirror M7. The distance detecting sensor 65 detects the distance from the object based on the received light, and the photographing lens 54 is automatically driven to the focussing position.

During this photometric and distance detecting operation, the other portion of light, which was reflected by the quick return mirror M5, is focussed on the second image sensor 63 after the optical image is reduced by the prism 61, as shown in FIG. 9B. The optical image focussed on the second image sensor 63 is photoelectrically converted to an electric signal, which is output via the buffer to the CDS circuit 631, the AGC circuit 632, and the A/D converter 633, for the prescribed signal processing.

The switch 90 is held on the side of the A/D converter 633 until the shutter is released, and therefore, the output line of the second image sensor 63 is connected to the image processor 80. The digitalized image data, which was originally output from the second image sensor 63, is taken in the image processor 80, and at the same time, written in the image memory 91 in synchronization with the output of the second image sensor 63.

The image data written in the image memory 91 is successively read out, subjected to pixel interpolation, colour balance control, and gamma correction by the pixel interpolation unit 83, the colour balance control unit 82, and the gamma correction unit 83, and again stored in the image memory 91. The processed data is read out of the image memory 91, and encoded into an NTSC/PAL format by the video encoder 84. The encoded data is output to the display panel 66 provided to the rear face of the camera body 52, and displayed as a preview image. These operations are repeated at a predetermined frame period, and consequently, the image displayed on the panel 66 is updated at a frame interval.

Because the second image sensor 63 has less pixels than the first image sensor 58, both the pixel data read-out time and the image processing time are shorter. This means that the frame period is set short, and the preview image is displayed as motion pictures with smooth movement of the object.

If the shutter release button is further depressed, the diaphragm 55 and the preview image are held, and simultaneously, the quick return mirror M5 rotates upward about the pivot axis 56, as shown in FIG. 9C. At this time, the switch 90 is changed over to the fist image sensor 58, and the A/D converter 583 is connected to the image processor 80. Then, as shown in FIG. 9D, the focal plane shutter 57 is opened and closed at a predetermined speed, and the light which passed through the photographing lens 54 and the diaphragm 55 is focussed on the first image sensor 58. The light image is photoelectrically converted into an electric signal, which is output via the buffer.

When the electric signal has been output, the quick return mirror M5 rotates and returns to the home position, and the light path L is switched to the second image sensor 63.

Since the number of pixels of the first image sensor 58 is relatively large, the read-out time and the image processing time are slightly long. However, it is not necessary to display the image at a video rate, processing time may be taken sufficiently to produce a high-quality image with a large angle of view.

The display panel 66 returns to the preview state after a predetermined time, and the same operations are repeated every time the shutter release button is fully depressed.

Figure 13:
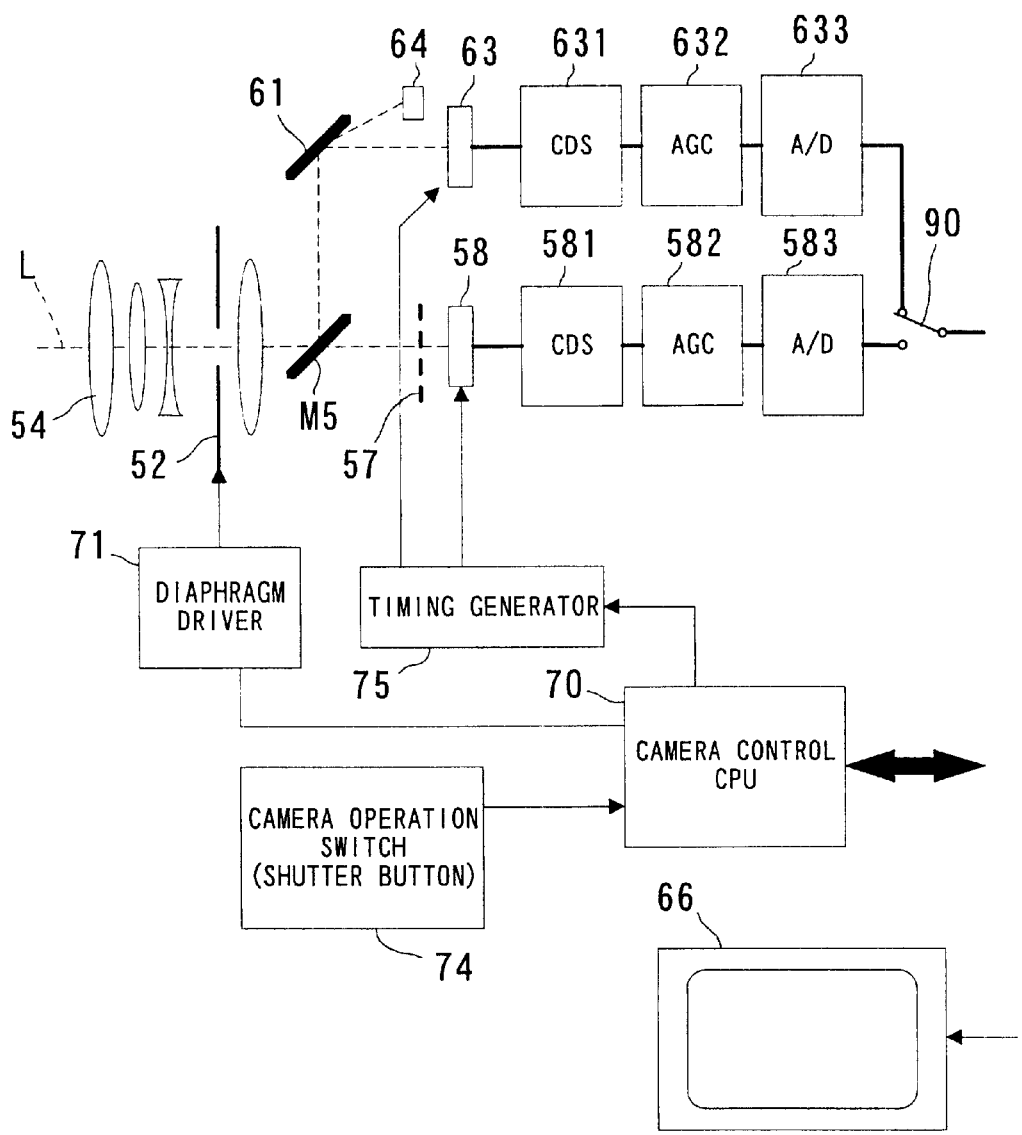
FIG. 13 is a block diagram of the electric system of a modification of the digital camera of the second embodiment of the present invention.

FIG. 13 illustrates a modification of the digital camera 51 shown in FIGS. 8 through 10. In this example, the frequencies of the driving control signals for the first and second image sensors are set equal. Accordingly, a common timing generator 75 for producing driving control signals is used. This configuration simplifies the circuit structure. FIG. 13 shows only the major part of the camera, and the other elements and structures are the same as those shown in FIGS. 9 and 10.

Figure 14:
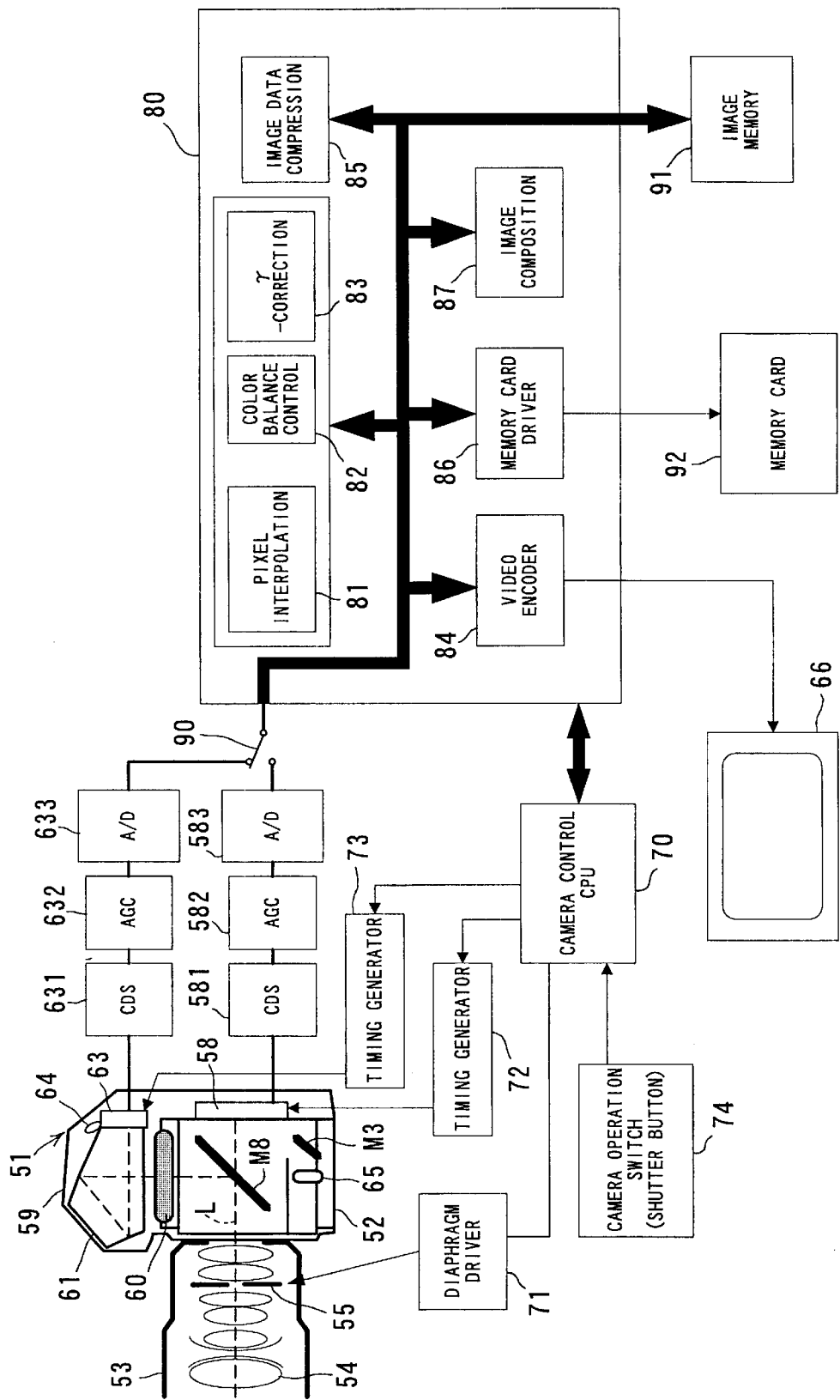
FIG. 14 is a block diagram of the electric system of another modification of the digital camera of the second embodiment of the present invention.

FIG. 14 illustrates another modification of the digital camera 51. In this example, the quality of a preview image is improved. The same elements as those shown in FIGS. 8 through 10 are denoted by the same numerical references.

In FIG. 14, a fixed-type half mirror M8 is used in place of the quick return mirror M5 shown in FIG. 8. A portion of the optical image formed by the photographing lens 54 is reflected by the half mirror M8 upward, and finally focussed on the second image sensor 63. The other portion of the optical image is transmitted through the half mirror M8, and focussed on the first image sensor 58.

Again, the first image sensor 58 is larger in size than the second image sensor 63, having more pixels, as in FIGS. 8 through 10. However, in this modification, the output region of the first image sensor 58 can be set to a desired range, and an image of a portion of the angle of view can be output.

The frequencies of the driving control signals, which are output from the timing generators 72 and 73 to the first and second image sensors 58 and 63, are set equal. In the preview mode, the second image sensor 63 outputs all the pixel signals, while the first image sensor 58 outputs pixels signals from only the center region of the pixel matrix. In this manner, the two read-out frames are consistent with each other.

The switch 90 may be changed over not only at a shutter release, but also in the preview mode. In other words, in the preview mode, the first image sensor 58 and the second image sensor 63 may be alternately connected to the image processor 80.

The image processor 80 has an image composition unit 87 which combines a portion of the image obtained from the first image sensor 58 with a portion of the image obtained from the second image sensor 63.

The other elements and structures are the same as those shown in FIGS. 8 through 10, and the explanation for them will be omitted.

In operation, if the shutter release button of the digital camera shown in FIG. 14 is half-depressed, a portion of the optical image formed by the photographing lens 54 is reflected upward by the half mirror M8, and focussed on the focussing screen 60. Then, the optical image is inverted and reduced by the pentagonal prism 61, and is focussed on the second image sensor 63. The optical image is photoelectrically converted into an electric pixel signal, which is then subjected to signal processing by the CDS circuit 631, the AGC circuit 632, and the A/D converter 633.

The switch 90 is held on the side of the A/D converter 633, and therefore, the output line of the second image sensor 63 is connected to the image processor 80. The digitalized image data, which was originally output from the second image sensor 63, is taken in the image processor 80, and at the same time, written in the image memory 91 in synchronization with the second image sensor 63. After the image data from the second image sensor 63 is taken in the image processor 80, the switch 90 is changed over to the first image sensor 58.

The image data written in the image memory 91 is further subjected to pixel interpolation, colour balance control, and gamma correction, and again stored in the image memory 91.

Meanwhile, a portion of the optical image formed by the photographing lens 54 is transmitted through the half mirror M8. The transmitted light is focussed on the first image sensor 58, and photoelectrically converted into electric pixel signals. However, only those pixel signals generated from the center portion of the pixel matrix, the dimensions of which are equal to the dimension of the second image sensor 63, are output from the first image sensor 58. Thus, the read-out frames of the first and second image sensors 58 and 63 agree with each other. The pixel signals output from the first image sensor 58 are then subjected to signal processing by the CDS circuit 581, the AGC circuit 582, and the A/D converter 583.

The digitalized image data of the first image sensor 58 is taken in the image processor 80 via the switch 90, and at the same time, written in the image memory 91.

In this fashion, a pair of frames of data from the first and second image sensors 58 and 63 are stored in the image memory 91.

Figure 15:
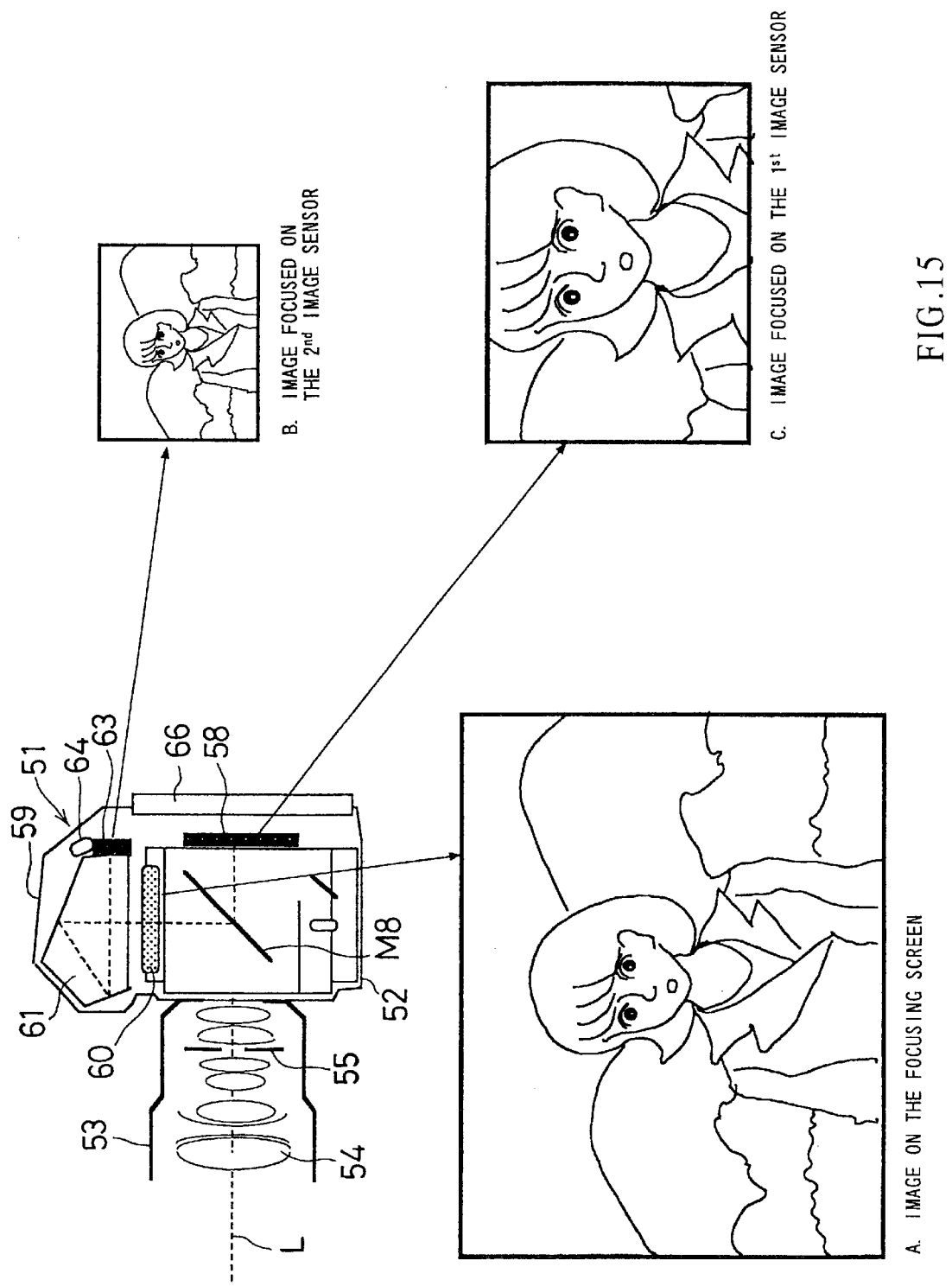
FIG. 15 illustrates the images obtained by the respective image sensors used in the digital camera shown in FIG. 14.

FIG. 15 illustrates three images, namely, two image formed by the first and second image sensors 58 and 63, and an image formed on the focussing screen 60.

Then, image data from the first image sensor 58 is reduced by resolution interpolation performed by the pixel interpolation unit 81 in order to produce a preview image. The image data from the second image sensor 63 is expanded again by resolution interpolation by the pixel interpolation unit 81 so that the sizes of the pixel matrices of the first and second image data become equal. Then, the two image data are combined (added) by the image composition unit 87.

Figure 16:
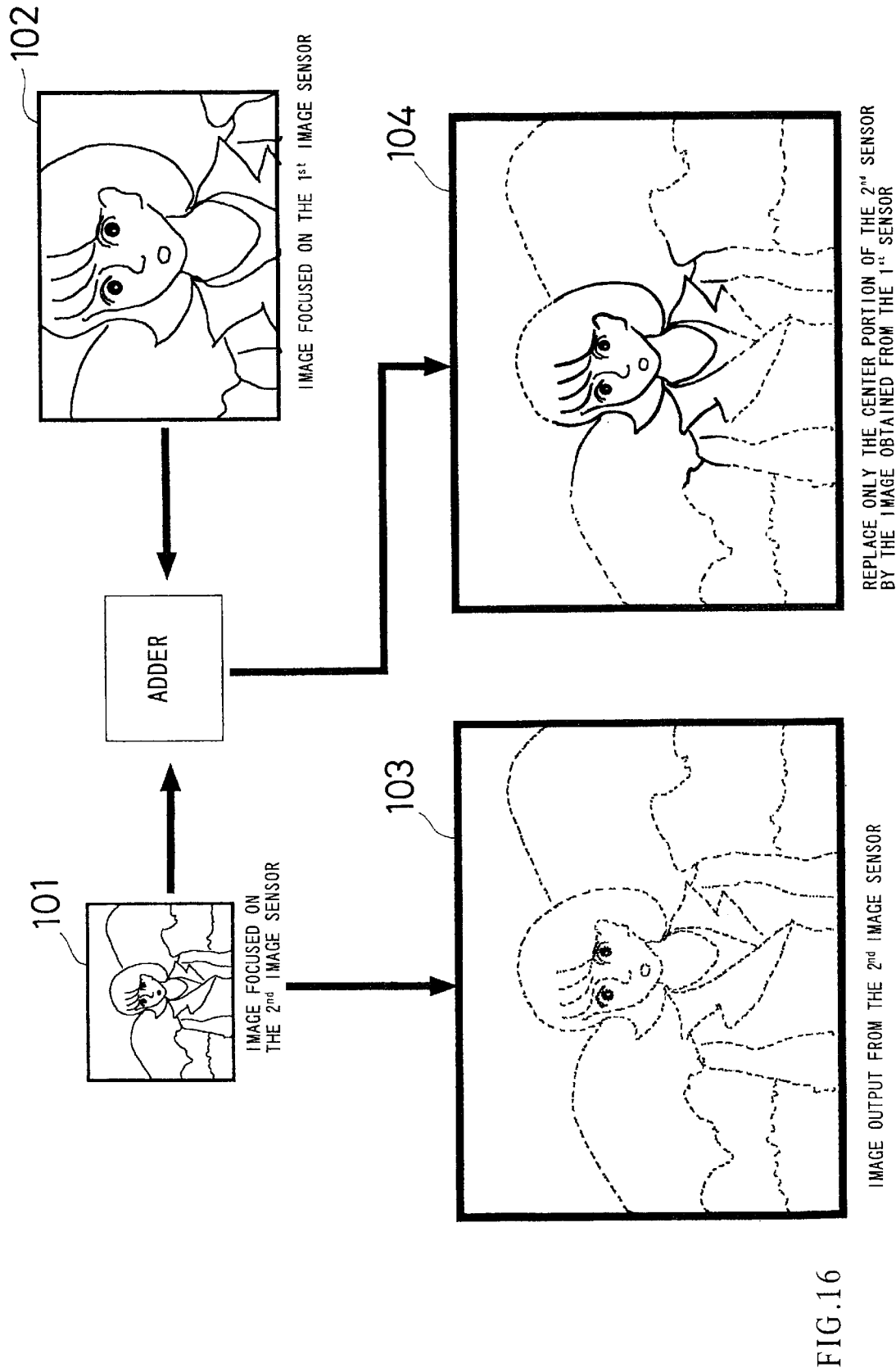
FIG. 16 illustrates an image composition process by the digital camera shown in FIG. 14.

As shown in FIG. 16, the center portion of the image (101 in FIG. 16) obtained from the second image sensor 63 is replaced by the image (102 in FIG. 16) from the first image sensor 58 to create a composite image (104 in FIG. 16). At 104 in FIG. 16, the image from the first image sensor 58 is depicted by the solid line, and the image from the second image sensor 63 is depicted by the dashed line. 103 in FIG. 16 shows a preview motion image output from the digital camera 51 shown in FIGS. 8 through 10.

Because the image quality of the first image sensor 58 is higher than that of the second image sensor 63, the stitching portion of the two images may be conspicuous due to the different image qualities.

Figure 17:
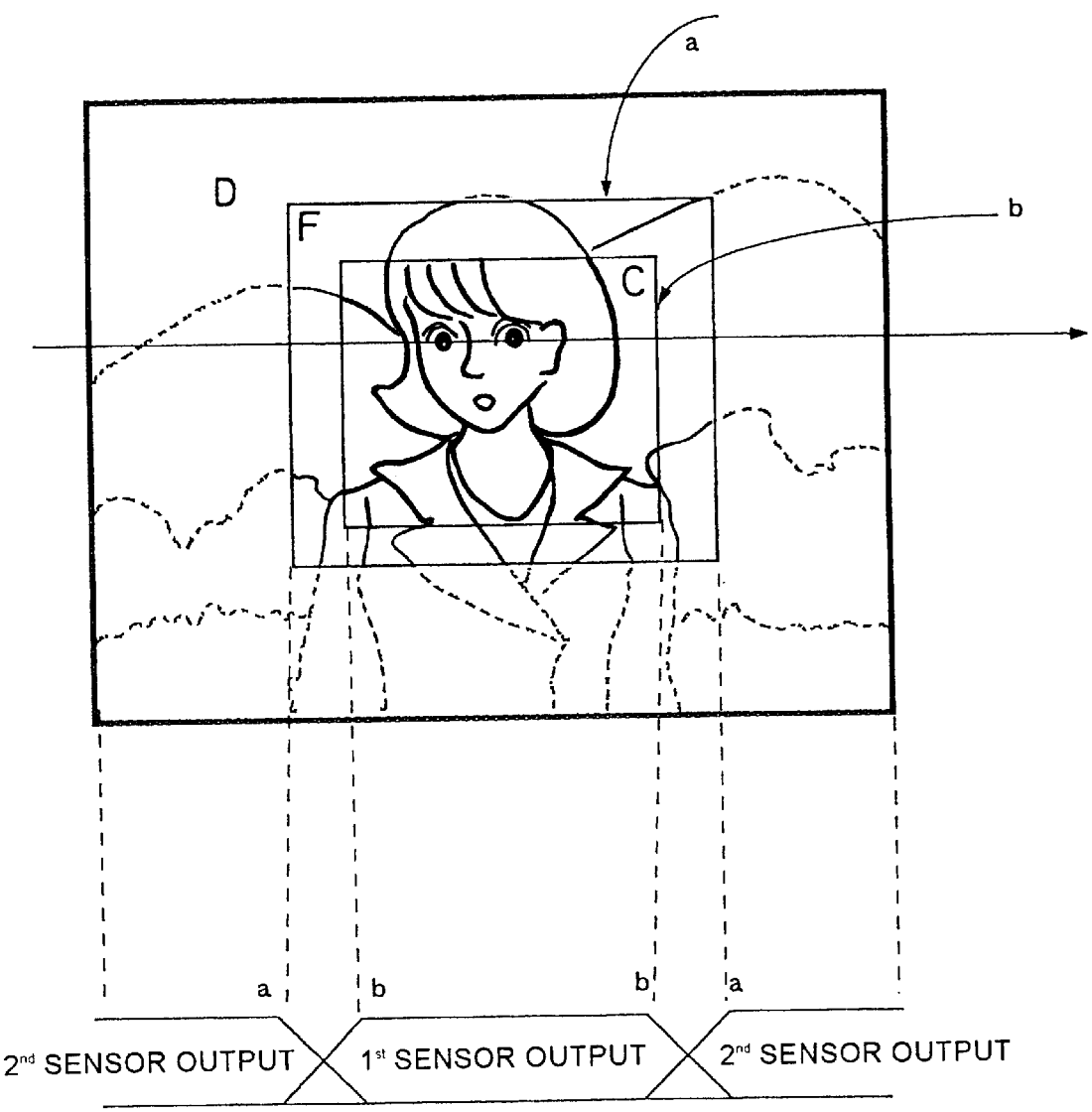
FIG. 17 illustrates another example of the image composition performed by the digital camera shown in FIG. 14.

In order to make the stitching portion inconspicuous, the output C from the first image sensor 58 is overlapped with the output D from the second image sensor 63, as shown in FIG. 17. The overlapped portion F, the starting and ending points of which are indicated by "a" and "b", is further processed so that the image quality of one image naturally fuses into that of the other image.

After the image composition, the composite image is stored in the image memory 91. The composite image is immediately read out from the image memory 91, encoded into an NTSC/PAL format by the video encoder 84, and displayed on the display panel 66 as a preview image. This preview image has an enhanced image quality in the center portion, which is clear and easy to see.

The aforementioned operations are repeated at a frame period, and a high-quality video (or motion) preview image is displayed on the display panel 66.

If the shutter is released, the switch 90 is changed over to the first image sensor 58, and the entirety of the optical image focussed on the first image sensor 58 is photoelectrically converted. The electric pixel signal is subject to the same signal processing and image processing as those described in connection with the digital camera shown in FIGS. 8 through 10. The processed image data is recorded as a photographed image in the memory card 92, and at the same time, displayed on the display panel 66.

Although, in the second embodiments of the present invention, two image sensors having different number of pixels are used, three or more image sensors may be used.

In the second embodiment, the larger image sensor with more pixels contributes to the image quality, and the smaller image sensor with less pixels contributes to quick read out. Therefore, the images obtained from these two sensors can be put to their proper use depending on the particular situation.

In particular, the image from the first image sensor with more pixels is used as a photographed image because of its high image quality, in spite of the slightly slow read-out speed, and the image from the second image sensor is used as a video (motion) preview image because of its quick read-out speed. Thus, the digital camera satisfies both a high image quality of a photographed image and a quick read-out of a preview image.

By combining a portion of the image from the first image sensor with the image from the second image sensor, the image quality of the preview image can be improved. For example, the center portion of the preview image from the second image sensor can be replaced by a high quality image from the first image sensor.

Although the present invention has been described based on the preferred embodiment, the terms and the sentences used in this specification are explanatory, and not limiting the present invention. It should be appreciated that there are many modifications and substitutions without departing from the spirit and scope of the present invention.

What is claimed is:

1. A photographing apparatus, comprising:
   a photographing lens;
   a first area sensor having a plurality of pixels and for photoelectrically converting an optical image of an object formed by the photographing lens into first pixel data;
   a second area sensor having a plurality of pixels and for photoelectrically converting an optical image of the object formed by the photographing lens into second pixel data, the number of pixels of the second area sensor being greater than the number of pixels of the first area sensor;
   a display for displaying the first pixel data supplied from the first area sensor as a preview image prior to image recording;
   a manipulation unit for starting the image recording; and
   a processor for combining the first and second pixel data supplied from the first and second area sensors when the manipulation unit was operated.

2. The photographing apparatus according to claim 1, wherein the first area sensor outputs colour information of the object, and the second area sensor outputs luminance information of the object.

3. The photographing apparatus according to claim 2, further comprising a corrector for providing contour correction to the luminance information supplied from the second area sensor.

4. The photographing apparatus according to claim 1, further comprising an optical system for switching optical paths between the first and second area sensors, one path guiding light reflected by the object and incident on the photographing lens to the first area sensor, and the other guiding the light to the second sensor.

5. The photographing apparatus according to claim 4, wherein the optical system is a movable mirror.

6. The photographing apparatus according to claim 1, further comprising a memory for recording the first pixel data supplied from the first area sensor before the manipulation unit is operated, wherein the processor combines the first pixel data recorded in the memory with the second pixel data captured by the second area sensor in synchronization with the manipulation of the manipulation unit.

7. The photographing apparatus according to claim 1, further comprising a relay lens system positioned before the first area sensor and for focussing the optical image of the object onto the first area sensor.

8. The photographing apparatus according to claim 1, wherein the photographing apparatus has a prohibition mode for prohibiting exposure time of the second area sensor from being set shorter than a predetermined time.

9. The photographing apparatus according to claim 8, wherein the photographing apparatus has a short exposure mode for allowing the exposure time of the second sensor to be set shorter than the predetermined time, and wherein the photographing apparatus further comprises a filter for decreasing the spatial frequency of the pixel data output from the first area sensor when the short exposure mode has been selected.

10. A photographing apparatus, comprising;

a photographing lens;

a first image pick-up device having a first light-receiving unit and for photoelectrically converting an optical image of an object formed by the photographing lens into first pixel data;

a second image pick-up device having a second light-receiving unit and for photoelectrically converting an optical image of the object formed by the photographing lens into second pixel data, the size of the second light-receiving unit being different from the size of the first light-receiving unit; and a relay lens system positioned before the first image pick-up device and for focussing the optical image of the object onto the first image pick-up device, wherein a ratio of the composite focal length of the photographing lens and the relay lens system to a size of the first light-receiving unit being equal to a ratio of the focal length of the photographing lens to a size of the second light-receiving unit.

11. A photographing apparatus, comprising:

a photographing lens;

a first image pick-up device having a plurality of pixels and for photoelectrically converting an optical image of an object formed by the photographing lens into first pixel data;

a second image pick-up device having a plurality of pixels and for photoelectrically converting an optical image of the object formed by the photographing lens into second pixel data, the number of pixels of the second image pick-up device being greater than the number of pixels of the first image pick-up device;

a display for displaying the first pixel data supplied from the first image pick-up device as a preview image prior to image recording;

a first processor for processing the first pixel data supplied from the first image pick-up device; and a second processor for processing the second pixel data supplied from the second image pick-up device, wherein only the first processor adjusts white balance.

12. A photographing apparatus, comprising:

a photographing lens;

a first image pick-up device having a plurality of pixels and for photoelectrically converting an optical image of an object formed by the photographing lens into first pixel data;

a second image pick-up device having a plurality of pixels and for photoelectrically converting an optical image of the object formed by the photographing lens into second pixel data, the number of pixels of the second image pick-up device being greater than the number of pixels of the first image pick-up device;

a display for displaying the first pixel data supplied from the first image pick-up device as a preview image prior to image recording; and a controller for controlling the first and second image pick-up devices at a same driving frequency.

13. A photographing apparatus, comprising:

a photographing lens;

a first image pick-up device having a plurality of pixels and for photoelectrically converting an optical image of an object formed by the photographing lens into first pixel data;

a second image pick-up device having a plurality of pixels and for photoelectrically converting an optical image of the object formed by the photographing lens into second pixel data, the number of pixels of the second image pick-up device being greater than the number of pixels of the first image pick-up device;

a processor for combining a part of the first pixel data obtained by the first image pick-up device with a part of the second pixel data obtained by the second image pick-up device to produce a composite image; and a display for displaying the composite image produced by the processor as a preview image prior to image recording.

14. A photographing apparatus, comprising:

a photographing lens;

a first area sensor having a plurality of pixels and for photoelectrically converting an optical image of an object formed by the photographing lens into first pixel data;

a second area sensor having a plurality of pixels and for photoelectrically converting an optical image of the object formed by the photographing lens into second pixel data, the number of pixels of the second area sensor being greater than the number of pixels of the first area sensor, and a size of the second area sensor being larger than a size of the first area sensor;

a display for displaying the first pixel data supplied from the first area sensor as a preview image prior to image recording; and a recorder for recording the second pixel data supplied from the second area sensor in a recording medium.

* * * * *

UNITED STATES PATENT AND TRADEMARK OFFICE
CERTIFICATE OF CORRECTION

PATENT NO. : 6,639,626 B1 Page 1 of 1
DATED : October 28, 2003
INVENTOR(S) : Hiroaki Kubo et al.

It is certified that error appears in the above-identified patent and that said Letters Patent is hereby corrected as shown below:

Title page,
Item [57], ABSTRACT,
Line 1, at the beginnning of the paragraph, delete "A", and insert -- An --.
Line 14, delete "form", and insert -- from --.

Column 3,
Line 6, delete "9B", and insert -- 9D --.
Line 10, delete "9;", and insert -- 9A-9D; --.

Column 11,
Line 53, delete "FIG. 9 illustrates", and insert -- FIGS. 9A-9D illustrate --.

Column 12,
Line 9, delete "FIG. 9", and insert -- FIGS. 9A-9D --.

Column 15,
Line 49, delete "9", and insert -- 9A-9D --.

Signed and Sealed this

Eighteenth Day of May, 2004

JON W. DUDAS
*Acting Director of the United States Patent and Trademark Office*